(12) United States Patent
Miyake

(10) Patent No.: US 7,218,591 B2
(45) Date of Patent: May 15, 2007

(54) OPTICAL PICKUP APPARATUS

(75) Inventor: Kohji Miyake, Higashihiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 395 days.

(21) Appl. No.: 10/417,986

(22) Filed: Apr. 16, 2003

(65) Prior Publication Data

US 2003/0223340 A1    Dec. 4, 2003

(30) Foreign Application Priority Data

| Apr. 17, 2002 | (JP) | ............................ P2002-115197 |
| May 29, 2002 | (JP) | ............................ P2002-156334 |
| Aug. 28, 2002 | (JP) | ............................ P2002-249551 |
| Nov. 29, 2002 | (JP) | ............................ P2002-348524 |

(51) Int. Cl.
   *G11B 7/00*    (2006.01)
(52) U.S. Cl. ................. 369/53.26; 369/116; 369/112.19
(58) Field of Classification Search .............. 369/53.26
   See application file for complete search history.

(56) References Cited

U.S. PATENT DOCUMENTS

| 4,972,400 | A | * | 11/1990 | Kuwabara et al. ....... 369/44.29 |
| 5,132,950 | A | * | 7/1992 | Sato et al. .............. 369/44.14 |
| 5,600,621 | A | * | 2/1997 | Noda et al. ............. 369/53.26 |
| 5,617,398 | A | * | 4/1997 | Lee et al. ............... 369/112.16 |
| 6,317,400 | B1 | | 11/2001 | Yanagawa et al. ....... 369/55.26 |
| 2001/0028625 | A1* | | 10/2001 | Asada et al. ............ 369/112.24 |
| 2001/0048063 | A1* | | 12/2001 | Yanagawa et al. ........... 250/205 |
| 2002/0018433 | A1* | | 2/2002 | Ohuchida .............. 369/112.07 |
| 2003/0058770 | A1* | | 3/2003 | Kuwahara et al. ....... 369/53.26 |

FOREIGN PATENT DOCUMENTS

| CN | 1100550 A | 3/1995 |
| JP | 3-125341 A | 5/1991 |
| JP | 4-222937 A | 8/1992 |
| JP | 5-334711 A | 12/1993 |
| JP | 6-12696 | 1/1994 |
| JP | 6-309685 A | 11/1994 |
| JP | 8-102080 | 4/1996 |
| JP | 10-255314 A | 9/1998 |
| JP | 11-273119 A | 10/1999 |
| JP | 11-328708 A | 11/1999 |
| JP | 2000-21001 | 1/2000 |

(Continued)

*Primary Examiner*—Wayne Young
*Assistant Examiner*—Lixi Chow
(74) *Attorney, Agent, or Firm*—Morrison & Foerster LLP

(57) ABSTRACT

An optical pickup apparatus is provided with two light sources; an objective lens for focusing light originating from each light source on an optical recording medium; a light separation optical element for transmitting or reflecting the light originating from each light source; a collimator lens for converting the light originating from each light source into a generally parallel beam; an upward-directing mirror for changing the optical path of the light originating from each light source by reflecting it; reflectors disposed between the light separation optical element and the respective light sources, for reflecting parts of light beams emitted from the light sources, respectively; photodetectors for detecting light beams reflected from the reflectors, respectively; and an APC circuit for controlling the power of the light beam emitted from each light source in accordance with a detection output of each photodetector.

8 Claims, 24 Drawing Sheets

FOREIGN PATENT DOCUMENTS

| | | |
|---|---|---|
| JP | 2000-229569 A | 8/2000 |
| JP | 2000-331365 A | 11/2000 |
| JP | 2001-118281 | 4/2001 |
| JP | 2001-118282 A | 4/2001 |
| JP | 2001-256666 A | 9/2001 |
| JP | 2001297474 | 10/2001 |
| JP | 2001-344804 A | 12/2001 |
| JP | 2002-92929 | 3/2002 |
| JP | 2003-132581 A | 5/2003 |

* cited by examiner

OPTICAL PICKUP APPARATUS

BACKGROUND OF THE INVENTION

1. Field of the Invention

The present invention relates to an optical pickup apparatus for recording or reproducing information on or from an optical recording medium.

2. Description of the Related Art

High output power semiconductor lasers are used as light sources of optical pickup apparatuses, in particular, ones capable of writing information to an optical recording medium. In such a high output power semiconductor laser, the reflectance of each of anti-reflecting coatings of the front and rear faces of a laser chip of the semiconductor laser is changed by changing its thickness. Therefore, the quantities of light beams that are emitted from the front and rear faces of the laser chip are different from each other. This makes it impossible to detect light that is emitted from the rear face by providing a light detecting device inside a semiconductor laser package and control the power of light that is emitted from the front face on the basis of a detection result.

For the above reason, in an optical pickup apparatus that is equipped with a semiconductor laser having a high output power, it is necessary to monitor the power of light that is emitted from the front face of a laser chip by providing a light detecting device for monitoring the optical output power of the semiconductor laser outside a semiconductor laser package and inside the optical pickup apparatus.

Among the conventional optical pickup apparatuses in which a light detecting device (front monitor) for monitoring the power of light emitted from the front face of a laser chip the semiconductor laser is provided outside a semiconductor laser package and inside the optical pickup apparatus is the following (e.g., refer to Japanese Unexamined Patent Publication JP-A 8-102080 (1996)).

FIG. 33 shows an example of optical output power monitoring of a conventional optical pickup apparatus 1 that is equipped with two light sources having different wavelengths.

The conventional optical pickup apparatus 1 is equipped with a first light source 2 and a second light source 3 that emit light beams having different wavelengths. A light beam emitted from the first light source 2 is converted into a generally parallel beam in passing through a first collimator lens 4, reflected by a beam splitter 5, reflected by an upward-directing mirror 6 so as to enter an objective lens 7, and focused on the information recording surface of an optical recording medium 8 by the objective lens 7. A light beam reflected by the optical recording medium 8 again passes through the objective lens 7, is reflected by the upward-directing mirror 6, passes through the beam splitter 5 and a half-mirror 9, and is detected by a photodetector 11 via a spot lens 10. A light beams emitted from the second light source 3 is converted into a generally parallel beam in passing through a second collimator lens 12, is reflected by the half-mirror 9, passes through the beam splitter 5, is reflected by the upward-directing mirror 6 so as to enter the objective lens 7, and is focused on the information recording surface of the optical recording medium 8 by the objective lens 7. A light beam reflected by the optical recording medium 8 travels along the same path as the above-described light beam emitted from the first light source does, and is detected by the photodetector 11.

A first front monitor 13 for monitoring the optical output power of the first light source 2 is disposed on the opposite side of the beam splitter 5 to the first light source 2, and detects a light beam that is emitted from the first light source 2 and passes through the first collimator lens 4 and the beam splitter 5. The first front monitor 13 outputs a detection result to a control means 15. The control means 15 controls the power of the light beam that is emitted from the first light source 2 is accordance with the detection output of the first front monitor 13.

On the other hand, a second front monitor 14 for monitoring the optical output power of the second light source 3 is disposed on the opposite side of the half-mirror 9 to the second light source 3, and detects a light beam that is emitted from the second light source 3 and passes through the second collimator lens 12 and the half-mirror 9. The second front monitor 14 outputs a detection result to the control means 15. The control means 15 controls the power of the light beam that is emitted from the second light source 3 is accordance with the detection output of the second front monitor 14.

In the conventional optical pickup apparatus 1 having the above configuration, the first front monitor 13 and the second front monitor 14 are disposed on the opposite side of the beam splitter 5 and the half-mirror 9 to the first light source 2 and the second light sources 3, which raises a problem that the apparatus 1 requires a large installation capacity and has a large size.

FIG. 34 shows an example of optical output power monitoring of another conventional optical pickup apparatus 20. The conventional optical pickup apparatus 20 is similar to the above conventional optical pickup apparatus 1, and hence components of the optical pickup apparatus 20 having corresponding components in the optical pickup apparatus 1 are given the same reference numerals as the latter. In the optical pickup apparatus 20, a hologram laser is used in place of the beam splitter 5 and the hologram laser 5 separates two light beams having different wavelengths from each other.

In another conventional optical pickup apparatus 20, a single front monitor 13 is provided and monitors the optical output powers of both of the first light source 2 and the second light source 3. A light beam emitted from the first light source 2 passes through the hologram laser 5 and is detected by the first front monitor 13. A light beam emitted from the second light source 3 is reflected by the hologram laser 5 and detected by the first front monitor 13. The first front monitor 13 outputs a detection result to the control means 15. The control means 15 controls the optical output power of the first light source 2 and the second light source 3 in accordance with the detection output of the first front monitor 13.

Although another conventional optical pickup apparatus 20 is smaller in the number of parts and hence is smaller in the size of the apparatus than the conventional optical pickup apparatus 1, the former has a problem that the accuracy of the optical power control is lower than in the latter. In general, the ratio between the quantity of transmission light and the quantity of reflection light in the hologram laser 5 is set so that the quantity of light used for recording or reproduction and that used for the optical output power monitoring become about 90% and about 10%, respectively. The quantity of light used for the optical output power monitoring, that is, the quantity of light that is emitted from the first light source 2 and transmits the hologram laser 5 or the quantity of light that is emitted from the second light source 3 and reflected by the hologram laser 5, varies by 10% to 20% depending on the characteristics of the hologram laser 5. It is virtually impossible to realize a beam splitter having such a light separation characteristic as not to cause such a light quantity variation, resulting in a problem that it is difficult to control, with high accuracy, the output power of light that is, emitted from the light source 2 or 3 in the above-described manner.

A semiconductor laser that is one kind of light source provided in an optical pickup apparatus outputs laser light, which is used for recording or reproduction of information on or from an optical recording medium. A semiconductor laser chip that is provided in the semiconductor laser and emits light changes in output power due to a variation in the ambient temperature, a variation with age, etc. The output power of the semiconductor laser chip is kept constant by controlling its drive current with an automatic power control (APC) circuit. Among the methods for keeping the output power of a semiconductor laser chip with the APC circuit are a rear monitoring method and a front monitoring method.

In the rear monitoring method, slight light that is emitted from the semiconductor laser chip in a direction (hereinafter referred to as "rear direction") that is opposite to a direction in which light is emitted from the semiconductor laser chip to reach an optical recording medium is used for an output power control. Light that is emitted in the rear direction is detected by a power control light detecting means that is provided in the semiconductor laser, and the APC circuit controls the output power of the semiconductor laser to a constant value by supplying it with a signal for controlling a drive current of the semiconductor laser chip in accordance with a detection output of the power control light detecting means.

However, the quantity of light emitted in the rear direction is smaller than that of light emitted in such a direction (hereinafter referred to as "front direction") as to reach the optical recording medium for recording or reproduction of information on or from the optical recording medium, and is insufficient to control the output power of the semiconductor laser chip.

The ratio of the quantity of light emitted in the rear direction to that of light emitted in the front direction is not necessarily stable. As a result, the rear monitoring method has a problem that the optical output power of the semiconductor laser cannot be controlled with high accuracy.

On the other hand, in the front monitoring method, light that is emitted in the front direction is detected by a monitoring photodetector and the APC circuit controls the output power of the semiconductor laser to a constant value by controlling its drive current in accordance with a detection output of the photodetector. Since, as described above, the quantity of light emitted in the front direction is larger than in the rear direction, to increase the accuracy of the output power control, in general, the front monitoring method is employed dominantly.

FIG. 35 is a simplified system diagram showing the configuration of a still another conventional optical pickup apparatus 31. Light that is emitted from a semiconductor laser chip 33 of a semiconductor laser 32 is converted into parallel light by a collimator lens 34 and enters a beam splitter 35. The beam splitter 35 has, at a prism junction surface 36, a reflection film that transmits 95% of incident light and reflects 5% of it. Therefore, most of incident light is transmitted toward an optical recording medium 40 and the remaining light is reflected toward a power control light detecting means 37.

Light that has passed through the beam splitter 35 is polarized by a quarter-wave plate 38, bent by 90° toward the optical recording medium 40 by an upward-directing mirror 39, and focused by an objective lens 41, whereby a light spot having a prescribed size is formed on the information recording surface of the optical recording medium 40 and information recording or reproduction is performed. Light that has been reflected by the optical recording medium 40 passes through the objective lens 41, bent by 90° by the upward-directing mirror 39, polarized by the quarter-wave plate 38, and input to the beam splitter 35. The beam splitter 35 reflects, 100%, toward a light detecting means 42, the light reflected from the optical recording medium 40. Resulting reflection light is focused by a focusing lens 43, given astigmatism by a cylindrical lens 44, and detected by the light detecting means 42, whereby information on the optical recording medium 40 is read.

Light that has been reflected by the beam splitter 35 toward the power control light detecting means 37 is condensed by a condenser lens 45 and detected by the power control light detecting means 37. An APC circuit 46 controls the output power of the semiconductor laser 32 to a constant value by supplying it with a signal for controlling a drive current of the semiconductor laser chip 33 in accordance with a detection output of the power control light detecting means 37.

To provide a semiconductor laser in which the load on a semiconductor laser chip and the power consumption are reduced and that has a high output power that is necessary in recording information on an optical recording medium, it is necessary to efficiently utilize, for an output power control on the semiconductor laser, light that is emitted from the semiconductor laser chip.

FIG. 36 is a simplified system diagram showing the configuration of a still another conventional optical pickup apparatus 47. The optical pickup apparatus 47 is a conventional optical pickup apparatus that efficiently utilize, for an output power control, light that is emitted from a semiconductor laser chip. Since light that is emitted from the semiconductor laser chip 33 is diverging light, there exists light 48 that goes outward instead of entering the collimator lens 34. Part of the outgoing light 48 is detected by a power control light detecting means 37. An APC circuit 46 controls the output power of the semiconductor laser 32 to a constant value by supplying it with a signal for controlling a drive current of the semiconductor laser chip 33 in accordance with a detection output of the power control light detecting means 37.

However, such a still another conventional optical pickup apparatus 47 has the following problem. Since the power control light detecting means 37 utilizes light that is emitted from the semiconductor laser chip 33 and goes outward instead of entering the collimator lens 34, the quantity of light that can be detected by the power control light detecting means 37 is very small. That is, the detection light quantity is too small for the APC circuit 46 to control the output power of the semiconductor laser chip 33 with high accuracy; the reliability of the output power control is low.

FIG. 37 is a simplified side view showing the arrangement of a conventional optical pickup apparatus 51 using the front control method. The operation of the conventional optical pickup apparatus 51 will be described below. Light that is emitted from a semiconductor laser 52 is converted by a collimator lens 53 into generally parallel light, which enters a beam splitter 54. The beam splitter 54 is configured so as to transmit 95%, for example, of light that is emitted from the semiconductor laser 52 and received via the collimator lens 53 and to reflect the remaining light (5%). That is, 95% of the received light passes through the beam splitter 54 and goes toward an optical recording medium 61 and the remaining light (5%) is reflected by the beam splitter 54 toward a monitoring light detecting means 56.

The 5%-light reflected by the beam splitter 54 is condensed by a condenser lens 55 and shines on the monitoring light detecting means 56. The monitoring light detecting means 56 outputs, to the APC circuit 57, an electrical signal corresponding to a detection light quantity. The APC circuit 57 controls the power of output light of the semiconductor laser 52 to a constant value by supplying it with a drive current of the semiconductor laser 52 in accordance with the electrical signal supplied from the monitoring light detecting means 56.

On the other hand, the 95%-light that has passed through the beam splitter 54 is polarized by a quarter-wave plate 58 in passing through it, directed by an upward-directing mirror 59 toward the optical recording medium 61, and focused on the information recording surface of the optical recording medium 61 by an objective lens 60 to as to form a light beam spot having a prescribed size. The light beams focused on the information recording surface of the optical recording medium 61 is reflected by the optical recording medium 61, again passes through the objective lens 60, is reflected by the upward-directing mirror 59, passes through the quarter-wave plate 58, and enters the beam splitter 54. The beam splitter 54 is configured so as to reflect almost 100% of the light reflected from the optical recording medium 61. The light reflected from the beam splitter 54 is focused by a focusing lens 62, given astigmatism by a cylindrical lens 63, and applied to a light detecting means 64. A tracking error signal and a focusing error signal for operation controls and an information signal (RF signal) are generated on the basis of the reflection light coming from the optical recording medium 61 that is detected by the light detecting means 64.

For recording or reproduction of information by an optical pickup apparatus (particularly for the information recording), a high optical output power is needed to attain high accuracy and quality. Further, to reduce the load on the semiconductor laser and the power consumption, it is necessary to efficiently utilize the power of output light of the semiconductor laser. However, 5% of the quantity of light that is emitted in the front direction for information recording or reproduction is used for the output power control. As such, the conventional optical pickup apparatus 51 has a problem that the efficiency of utilization of light is low.

To solve the above problem, a conventional optical pickup apparatus is available in which light that is emitted from a semiconductor laser is detected directly (front monitoring). FIG. 38 is a simplified side view showing the arrangement of another conventional optical pickup apparatus 65 using the front monitoring method. The conventional optical pickup apparatus 65 is similar to the above conventional optical pickup apparatus 51, and hence components of the optical pickup apparatus 65 having corresponding components in the optical pickup apparatus 51 are given the same reference numerals as the latter and will not be described.

In another conventional optical pickup apparatus 65, light 66 that is emitted from the semiconductor laser 52 and goes off the optical axis without passing through the collimator lens 53, that is, the light 66 that is not used for information recording or reproduction, is detected directly by a monitoring light detecting means 56. The monitoring light detecting means 56 outputs, to an APC circuit 57, an electrical signal corresponding to a detection light quantity. The APC circuit 57 controls the output power of the semiconductor laser 52 to a constant value in accordance with the electrical signal supplied from the monitoring light detecting means 56. In the optical pickup apparatus 65, no part of light that is emitted from the semiconductor laser 52 for information recording or reproduction is divided and used for the output power control and hence the efficiency of utilization of the light emitted from the semiconductor laser 52 can be made high.

However, in the conventional optical pickup apparatus 65, since the monitoring light detecting means 56 directly detects only a very small part of light that diverges outside the outer periphery of the collimator lens 53, the detection light quantity is small and the electrical signal that can be used for controlling the output power of the semiconductor laser 52 is very weak. Therefore, the output power control on the semiconductor laser 52 by the APC circuit 57 cannot be performed with sufficient accuracy or stability, raising a problem that the reliability of the output power control is low.

SUMMARY OF THE INVENTION

An object of the present invention is to provide an optical pickup apparatus in which the optical output power of a light source can be controlled with high accuracy without increasing the size of the apparatus.

Another object of the invention is to provide an optical pickup apparatus in which the efficiency of utilization of light emitted from a semiconductor laser chip can be made high and the optical output power of the semiconductor laser chip can be controlled with high accuracy.

A further object of the invention is to provide an optical pickup apparatus in which the efficiency of utilization of light emitted from a light source can be made high and the reliability of a control on the power of light emitted from the light source can be increased.

The invention provides an optical pickup apparatus which records or reproduces information on or from an optical recording medium, comprising a light source for emitting light; an objective lens opposed to the optical recording medium, for focusing light originating from the light source on the information recording surface of the optical recording medium; a light separation optical element disposed between the light source and the objective lens, for transmitting or reflecting the light originating from the light source; a collimator lens disposed between the light separation optical element and the objective lens, for converting the light originating from the light source into generally parallel light; light reflecting means for reflecting part of the light emitted from the light source; optical output power detecting means for detecting the light reflected from the light reflecting means; and optical power control means for controlling the power of the light emitted from the light source in accordance with a detection output of the optical output power detecting means.

According to the invention, the light reflecting means for reflecting part of light emitted from the light source is provided. Light reflected from the light reflecting means is detected by the optical output power detecting means, and the optical output power of the light source is controlled in accordance with a resulting detection output. This configuration makes it possible to control the optical output power of the light source with high accuracy without altering the optical system for recording and/or reproducing information on and/or from the optical recording medium.

In the invention it is preferable that the light reflecting means is disposed between the light source and the light separation optical element.

According to the invention, the light reflecting means is disposed between the light source and the light separation optical element. This configuration makes it possible to make the installation capacity smaller than in a case that the light reflecting means is disposed on the opposite side of the light separation optical element to the light source, to thereby miniaturize the apparatus. Since the optical output power can be monitored by reflecting, with the light reflecting means, light that has not passed through or been reflected by the light separation optical element, the optical output power of the light source can be controlled with high accuracy.

In the invention it is preferable that the light reflecting means is disposed on an axis that is associated with a larger one of spread angles that are associated with two respective orthogonal axes formed on a plane that is perpendicular to the optical axis of the light emitted from the light source.

According to the invention, disposing the light reflecting means on the axis that is associated with the larger one of the spread angles of light emitted from the light source makes it possible to reflect a larger quantity of light and use it for monitoring. Therefore, the optical output power of the light source can be controlled with high accuracy.

In the invention it is preferable that the optical pickup apparatus further comprises an optical path changing reflector disposed between the collimator lens and the objective lens, for reflecting the light originating from the light source to change its optical path, and the light reflecting means is disposed in such a manner that the normal to the reflecting surface of the reflecting means is not parallel with the optical axis of light that is reflected from the optical path changing reflector toward the optical recording medium.

In the invention it is preferable that two light sources that emit light beams having different wavelengths are provided, and two light reflecting means are provided so as to be associated with the two respective light sources.

According to the invention, disposing the light reflecting means in such a manner that the normal to the reflecting surface of the reflecting means is not parallel with the optical axis of light that is reflected from the optical path changing reflector toward the optical recording medium makes it possible to effectively use light emitted from the light source for the output power control without increasing the thickness of the optical pickup apparatus. Also in what is called a double-wavelength optical pickup apparatus provided with two light sources that emit light beams having different wavelengths, the same advantage can be obtained by disposing, in the above manner, each of two light reflecting means that are associated with the two respective light sources.

Further, in the invention it is preferable that the light reflecting means is attached to the light separation optical element.

According to the invention, the light reflecting means is attached to the light separation optical element. With this configuration, a large-capacity installation space is not necessary and hence the apparatus can be minimized.

In the invention it is preferable that the light reflecting means is attached to the collimator lens.

In the invention it is preferable that the optical pickup apparatus further comprises a holding member for holding the collimator lens, and the light reflecting means is attached to the holding member.

According to the invention, where the light reflecting means is attached to the collimator lens or the holding member for holding the collimator lens a large-capacity installation space is not necessary and hence the apparatus can be minimized.

In the invention it is preferable that the optical pickup apparatus further comprises an optical path changing reflector disposed between the collimator lens and the objective lens, for reflecting the light originating from the light source to change its optical path, and the light reflecting means is attached to the optical path changing reflector.

According to the invention, the light reflecting means is attached to the optical path changing reflector. With this configuration, a large-capacity installation space is not necessary and hence the apparatus can be minimized.

The invention provides an optical pickup apparatus which records or reproduces information on or from an optical recording medium, comprising a light source for emitting light; an objective lens opposed to the optical recording medium, for focusing light originating from the light source on the information recording surface of the optical recording medium; a light separation optical element disposed between the light source and the objective lens, for transmitting or reflecting the light originating from the light source; a collimator lens disposed between the light separation optical element and the objective lens, for converting the light originating from the light source into generally parallel light; an optical path changing reflector disposed between the collimator lens and the objective lens, for reflecting the light originating from the light source to change its optical path; optical output power detecting means for detecting part of light that is emitted from the light source, passes through the collimator lens, and goes by the optical path changing reflector instead of shining on it; and optical power control means for controlling the power of the light emitted from the light source in accordance with a detection output of the optical output power detecting means.

According to the invention, since part of light that goes by the optical path changing reflector instead of shining on it is detected by the optical output power detecting means, the optical output power can be monitored without the need for using light reflecting means. Therefore, not only can the apparatus be miniaturized but also the efficiency of assembling of the apparatus can be increased because the number of parts is reduced.

The invention provides an optical pickup apparatus which records or reproduces information on or from an optical recording medium by using light, comprising a light source for emitting light; light detecting means for detecting part of the light emitted from the light source; light collecting means for directing, to the light detecting means, part of the light emitted from the light source that is not used for information recording or reproduction; and control means for controlling the power of the light emitted from the light source in accordance with an output of the light detecting means.

According to the invention, a signal is produced on the basis of a light quantity that is detected by the light detecting means and the control means controls the power of light emitted from the light source in accordance with the signal thus produced. The light detecting means can detect both of direct incident light that is emitted from the light source but is not used for information recording or reproduction and light that shines on the light detecting means via the light collecting means. Therefore, the reception light quantity that can be used for the optical power control is increased and hence the accuracy of the optical power control can be increased.

Further, since light that is emitted from the light source but is not used for information recording or reproduction is used for the optical power control, the quantity of light that is emitted from the light source and used for information recording or reproduction is not reduced and hence the efficiency of utilization of light can be increased.

In the invention it is preferable that the light collecting means is a reflecting mirror for reflecting, toward the light detecting means, part of the light emitted from the light source.

According to the invention, the reflecting mirror reflects, toward the light detecting means, light that is emitted from the light source and goes off the optical axis in a direction that is different from the direction toward the light detecting means. Since the light quantity that is used for the output power control on the light source can be increased by receiving the light reflected from the reflecting mirror with the light detecting means, the output power of the light source can be controlled with high accuracy.

In the invention it is preferable that the reflecting mirror is a concave reflecting mirror.

According to the invention, the concave reflecting mirror reflects, toward the light detecting means, light that is emitted from the light source and goes off the optical axis in a direction that is different from the direction toward the light detecting means while focusing it. Since light that is reflected and focused by the concave reflecting mirror is received by the light detecting means, the reduction in light quantity due to divergence is small and hence the light quantity that is used for the output power control on the light source is increased, whereby the output power of the light source can be controlled with high accuracy.

In the invention it is preferable that the light collecting means comprises a focusing lens for focusing light emitted from the light source, and a reflecting mirror for reflecting, toward the light detecting means, converging light produced by the focusing lens.

According to the invention, the focusing lens focuses light that is emitted from the light source and goes off the optical axis in a direction that is different from the direction toward the light detecting means and the reflecting mirror reflects the thus-produced converging light toward the light detecting means. Since converging light that is reflected by the reflecting mirror is received by the light detecting means, the reduction in light quantity due to divergence is small and hence the light quantity that is used for the output power control on the light source is increased, whereby the output power of the light source can be controlled with high accuracy.

In the invention it is preferable that the light collecting means comprises first and second reflecting mirrors for reflecting, toward the light detecting means, respective parts of the light emitted from the light source.

According to the invention, the first and second reflecting mirrors reflects, toward the light detecting means, respective light beams emitted from the light source and go off the optical axis in directions that are different from the direction toward the light detecting means. Since light beams reflected from the first and second reflecting mirrors are received by the light detecting means and the light quantity that is used for the output power control on the light source is thereby increased, the output power of the light source can be controlled with high accuracy.

In the invention it is preferable that each of the first and second reflecting mirrors is a concave reflecting mirror.

According to the invention, the first and second concave reflecting mirrors reflect, toward the light detecting means, respective light beams emitted from the light source and go off the optical axis in directions that are different from the direction toward the light detecting means while focusing light beams. Since light beams reflected and focused by the first and second concave reflecting mirrors can be received by the light detecting means, the reduction in light quantity due to divergence is small and the light quantity that is used for the output power control on the light source is increased, whereby the output power of the light source can be controlled with high accuracy.

In the invention it is preferable that the light collecting means comprises a first focusing lens for focusing part of the light emitted from the light source, a reflecting mirror for focusing converging light produced by the first focusing lens toward the light detecting means, and a second focusing lens for focusing another part of the light emitted from the light source on the light detecting means.

According to the invention, the first focusing lens focuses light that is emitted from the light source and goes off the optical axis in a direction that is different from the direction toward the light detecting means and the reflecting mirror reflects the thus-produced converging light toward the light detecting means. The second focusing lens focuses another light beam that is emitted from the light source and goes off the optical axis toward the light detecting means. Since both of converging light that is reflected by the reflecting mirror and light that is focused by the second focusing lens are received by the light detecting means, the reduction in light quantity due to divergence is small and the light quantity that is used for the output power control on the light source is increased, whereby the output power of the light source can be controlled with high accuracy.

In the invention it is preferable that the light collecting means comprises first and second focusing lenses for focusing respective parts of the light emitted from the light source, a first reflecting mirror for reflecting, toward the light detecting means, converging light produced by the first focusing lens, and a second reflecting mirror for reflecting, toward the light detecting means, converging light produced by the second focusing lens.

According to the invention, the first and second focusing lenses focus light beams that are emitted from the light source and go off the optical axis in directions that are different from the direction toward the light detecting means and the first and second reflecting mirrors respectively reflect converging beams produced by the first and second focusing lenses toward the light detecting means. Since converging beams that are reflected by the first and second reflecting mirror and light that is focused by the second focusing lens are received by the light detecting means, the reduction in light quantity due to divergence is small and the light quantity that is used for the output power control on the light source is increased, whereby the output power of the light source can be controlled with high accuracy.

The invention provides an optical pickup apparatus which records or reproduces information on or from an optical recording medium by using light, comprising a light source for emitting light; light detecting means for detecting part of the light emitted from the light source; light separating means for separating part of the light emitted from the light source that is to be used for information recording or reproduction and directing, to the light detecting means, the part of the light; and control means for controlling the power of the light emitted from the light source in accordance with an output of the light detecting means.

According to the invention, a signal is produced on the basis of a light quantity that is detected by the light detecting means and the control means controls the power of light emitted from the light source in accordance with the signal thus produced. The light detecting means can detect both of direct incident light that is emitted from the light source but is not used for information recording or reproduction and part of light to be used for information recording or reproduction. Therefore, the reception light quantity that can be used for the optical power control is increased and hence the accuracy of the optical power control can be increased. Further, since light that is emitted from the light source but is not used for information recording or reproduction is used for the output power control, the efficiency of utilization of light can be increased.

In the invention it is preferable that the light separating means comprises a beam splitter having a light separating surface in which a particular portion has different reflectance than the other portion.

According to the invention, the beam splitter reflects, toward the light detecting means, part of light that is emitted from the light source and is to be used for information recording or reproduction. Since the light reflected from the beam splitter is received by the light detecting means and the light quantity that is used for the output power control on the light source is thereby increased, whereby the output power of the light source can be controlled with high accuracy.

In the invention it is preferable that the light separating surface of the beam splitter in which the particular portion has different reflectance than the other portion is formed by coating of coating materials having different reflectance values.

According to the invention, the light separating surface is formed by coating of coating materials having different reflectance values and the particular portion has different reflectance than the other portion. This makes it possible to easily provide a light separating surface in which the particular portion has different reflectance than the other portion. Therefore, light to be used for controlling the output power of the light source can be extracted at a desired ratio from light emitted from the light source.

In the invention it is preferable that the light separating means further comprises a focusing lens for focusing light reflected from the beam splitter.

According to the invention, since the light separating means comprises the focusing lens, light that has been reflected and separated by the beam splitter is input to the light detecting means while being focused. Therefore, light that has been reflected by the beam splitter can be input to the light detecting means without reducing the light quantity due to divergence and hence the light quantity that can be used for the output power control on the light source can further be increased, whereby the output power of the light source can be controlled with high accuracy.

In the invention it is preferable that the light detecting means comprises light detecting element for detecting light, converting detected light into a current or voltage signal and outputting the signal, and signal amplifying means for amplifying the signal outputted from the light detecting element, wherein the light detecting element, and the signal amplifying means are integrated into a single part.

According to the invention, the light detecting means that is a single part formed by integrating the light detecting element, e.g., photodiode and the signal amplifying means contributes to miniaturization of the optical pickup apparatus.

According to the invention, the light detecting means can detect both of direct incident light that is emitted from the light source but is not used for information recording or reproduction and light that goes off the optical axis in a direction different from the direction toward the light detecting means or part of light to be used for information recording or reproduction. Therefore, the reception light quantity that can be used for the optical power control is increased and hence the accuracy of the optical power control can be increased. Further, since the optical power control is enabled without reducing the quantity of light that is emitted from the light source and is to be used for information recording or reproduction, the efficiency of utilization of light can be increased.

The invention provides an optical pickup apparatus which records or reproduces information on or from an optical recording medium by using light, comprising a light source for emitting light; light reflecting means for reflecting part of the light emitted from the light source that is not used for information recording or reproduction; monitoring light detecting means for detecting the light reflected from the light reflecting means; control means for controlling the power of the light emitted from the light source in accordance with a detection output of the monitoring light detecting means; focusing means for focusing light that originates from the light source and is used for information recording or reproduction on the information recording surface of the optical recording medium; and light detecting means for detecting light reflected from the optical recording medium.

According to the invention, light reflecting means reflects part of the light emitted from the light source that is not used for information recording or reproduction, the monitoring light detecting means detects the reflected light, and the control means controls the power of the light emitted from the light source in accordance with a detection output of the monitoring light detecting means. Since light that is emitted from the light source but is not used for information recording or reproduction is used for the output power control, the light emitted from the light source can be utilized with high efficiency. The light reflecting means increases the quantity of reflection light that is not used for information recording or reproduction and hence the reception light quantity of the monitoring light detecting means is increased. Therefore, since the strength of the optical power control by the control means can be increased, the accuracy and the stability of the optical power control can be increased.

In the invention it is preferable that the light reflecting means comprises a plurality of light reflecting portions and each light reflecting portion is disposed symmetrically with respect to the optical axis of the light emitted from the light source, and the monitoring light detecting means is disposed at a position that is equidistant from the light reflecting portion.

According to the invention, since the light reflecting means comprises a plurality of the light reflecting portions, the quantity of reflection light that is emitted from the light source but is not used for information recording or reproduction can be increased. Since the plurality of light reflecting portions are disposed symmetrically with respect to the optical axis of the light emitted from the light source and the monitoring light detecting means is disposed at a position that is equidistant from the light reflecting portion, the monitoring light detecting means can receive reflection beams coming from the respective light reflecting portion in a well-balanced manner. This suppresses a variation in reception light quantity due to a distorted intensity distribution of a light beam emitted from the light source, whereby the accuracy of the optical power control can be improved. Further, the above arrangement realizes most efficient space utilization for the setting of the light reflecting means and the monitoring light detecting means (they compete for space).

In the invention it is preferable that the light reflecting means is of a parallelepiped shape extending in a longitudinal direction and in which a light reflecting layer is formed on one end face in the longitudinal direction.

According to the invention, the light reflecting means has a parallelepiped shape extending in the longitudinal direction and in which a light reflecting layer is formed on one end face in the longitudinal direction. This structure facilitates handling of the light reflecting means and prevents an operator form mistaking another face for the face on which the light reflecting layer is formed. Erroneous mounting of the light reflecting means in the apparatus can be avoided.

In the invention it is preferable that the light reflecting means is of a parallelepiped shape extending in a longitudinal direction and in which light reflecting layers are formed on two respective end faces, opposed to each other, in the longitudinal direction.

According to the invention, in the light reflecting means, the light reflecting layers are formed on two respective end faces, opposed to each other, in the longitudinal direction. This structure allows either of the two end faces to be used as the light reflecting surface. Therefore, by preparing only one kind of light reflecting means, a plurality of light reflecting means can be disposed at positions that are symmetrical with respect to the optical axis and that allow the monitoring light detecting means to receive reflection beams. The number of parts can be reduced, which contributes to reduction in manufacturing cost.

In the invention it is preferable that the optical pickup apparatus further comprises light branching means for transmitting and reflecting light that is emitted from the light source and is used for information recording or reproduction, and one side face of the light reflecting means that is parallel with the longitudinal direction is attached directly to a face of the light branching means that is opposed to the light source.

According to the invention, the one side face of the light reflecting means that is parallel with the longitudinal direction is attached directly to a face of the light branching means that is opposed to the light source. This configuration simplifies position adjustment of the light reflecting means during assembling of the apparatus, which contributes to increasing the efficiency of manufacture.

In the invention it is preferable that the light reflecting means is a concave mirror.

According to the invention, the light reflecting means is a concave mirror. Having a focusing function, the concave mirror reflects and focuses light that is emitted from the light source and is not used for information recording or reproduction and thereby causes it to be received by the monitoring light detecting means. This allows a light receiving and detecting portion of the monitoring light detecting means to receive reflection light more efficiently, which increases the accuracy and the stability of the optical power control.

In the invention it is preferable that the light reflecting means comprises two light reflecting portions that are arranged perpendicularly to or parallel with a rotation axis of the optical recording medium being mounted so as to face the focusing means and that are disposed at positions that are symmetrical with respect to the optical axis of the light emitted from the light source.

According to the invention, the two light reflecting portions may be arranged either perpendicularly to or parallel with the rotation axis of the optical recording medium. This provides a certain margin for the setting (mounting) of the light reflecting means and hence facilitates mounting position setting of other optical parts (they compete for space).

In the invention it is preferable that the light source and the light detecting means are integrated into a single part.

According to the invention, the light source and the light detecting means is integrated into a single part. This reduces the number of parts used in assembling the apparatus and hence can increase the efficiency of assembling work.

In the invention it is preferable that a plurality of light sources are included.

According to the invention, the apparatus can be provided with, for example, a plurality of light sources capable of emitting light beams having different wavelengths. An optical pickup apparatus can be provided that can accommodate two kinds of optical recording media such as the compact disc (CD) and the digital versatile disc (DVD) having different wavelength, for using for information recording and reproduction.

In the invention it is preferable that the monitoring light detecting means comprises a photodiode for converting detected light into a current or voltage signal.

In the invention it is preferable that the monitoring light detecting means comprises a photodiode for converting detected light into a current or voltage signal and signal amplifying means for amplifying the current or voltage signal converted by the photodiode, wherein the photodiode and the signal amplifying means are integrated into a single part.

According to the invention, the monitoring light detecting means comprises a photodiode (PD) for converting light into a current or voltage signal. Alternatively, the monitoring light detecting means may comprise a photodiode integrated circuit (PDIC) in which the PD for converting light into a current or voltage signal and, for example, an integrated circuit (IC) with signal amplifying means for amplifying the current or voltage signal produced by the photodiode are integrated with each other. With this configuration, reflection light for the optical power control that is received by the PD as the monitoring light detecting means is efficiently converted into an electrical signal. Further, using, as the monitoring light detecting means, a PDIC which is an integrated part makes it possible to reduce the number of parts used in assembling the apparatus and hence to increase the efficiency of assembling work.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
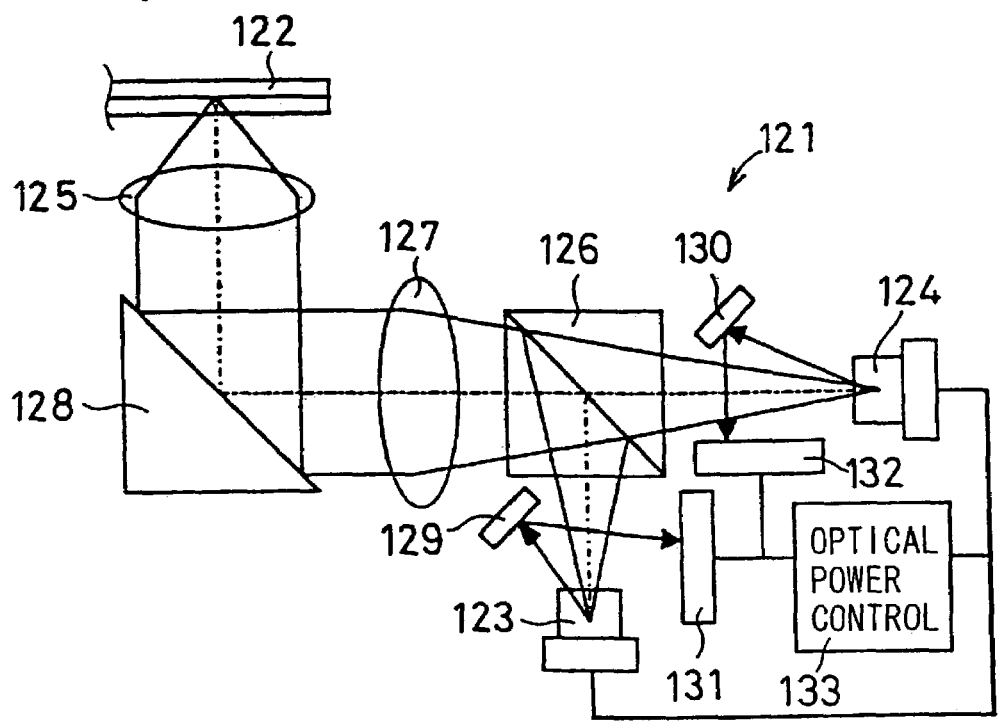
FIG. 1 is a simplified system diagram showing the configuration of an optical pickup apparatus according to a first embodiment of the present invention.

Now referring to the drawings, preferred embodiments of the invention are described below.

FIG. 1 is a simplified system diagram showing the configuration of an optical pickup apparatus 121 according to a first embodiment of the present invention. The optical pickup apparatus 121 records or reproduces information on or from an optical recording medium 122. The optical pickup apparatus 121 is provided with a first light source 123 and a second light source 124 serving as light sources; an objective lens 125; a light separation optical element 126; a collimator lens 127; an optical path changing reflector 128; a first light reflecting means 129 and a second light reflecting means 130 as a light reflecting means; a first optical output power detecting means 131 and a second optical output power detecting means 132 as an optical power detecting means; and an optical output power control means 133 as an optical output power control means.

The first light source 123 and a second light source 124 emit light beams having different wavelengths. The objective lens 125 opposed to the optical recording medium 122, for focusing light originating from the first light source 123 or the second light source 124 on the information recording surface of the optical recording medium 122. The light separation optical element 126 disposed between the objective lens 125 and the first and second light sources 123 and 124, to transmit or reflect the light originating from the first light source 123 or the second light source 124. The collimator lens 127 disposed between the light separation optical element 126 and the objective lens 125, for converting the light originating from the first light source 123 or the second light source 124 into generally parallel light. The optical path changing reflector 128 disposed between the collimator lens 127 and the objective lens 125 and reflects the light originating from the first light source 123 or the second light source 124 to change its optical path.

The first light reflecting means 129 reflects part of the light beam emitted from the first light source 123. The second light reflecting means 130 reflects part of the light beam emitted from the second light source 124. The first optical output power detecting means 131 detects the light reflected from the first light reflecting means 129. The second optical output power detecting means 132 detects the light reflected from the second light reflecting means 130. The optical output power control means 133 controls the power of the light emitted from the first light source 123 or the second light source 124 in accordance with a detection output of the first optical output power detecting means 131 or the second optical output power detecting means 132.

For example, the first light source 123 is a semiconductor laser that emits infrared laser light having a wavelength 780 nm and is used for recording and reproduction of information on and from a compact disc (CD). For example, the second light source 124 is a semiconductor laser that emits red laser light having a wavelength 650 nm and is used for recording and reproduction of information on and from a digital versatile disc (DVD). The light separation optical element 126 is a beam splitter such as a Glan-Thompson prism. The light separation optical element 126 reflects incident light originating from the first light source 123, and transmits incident light originating from the second light source 124 and thereby causes it to enter the collimator lens 127. The light path changing reflector 128, which is a mirror called "upward-directing mirror," bends the optical path of light that has passed through the collimator lens 127 by 90° by reflecting it and thereby causes reflected light to enter the objective lens 125 which is opposed to the optical recording medium 122.

Light that is emitted from the first light source 123 is reflected by the light separation optical element 126, converted into generally parallel light by the collimator lens 127, and reflected by the optical path changing reflector 128, whereby its optical path is bent by 90°. Reflected light enters the objective lens 125 and is focused on the information recording surface of the optical recording medium 122 by the objective lens 125. Light that is emitted from the second light source 124 passes through the light separation optical element 126 and enters the collimator lens 127. Light that is output from the collimator lens 127 is thereafter focused on the information recording surface of the optical recording medium 122 in the same manner as the light originating from the first light source 123. In this manner, the optical pickup apparatus 121 can record information on the optical recording medium 122.

To reproduce information from the optical recording medium 122, light that has been reflected by the optical recording medium 122 goes along the same optical path as in the information recording in the reverse direction and is detected by photodetectors that are not shown and are provided adjacent to the first light source 123 and the second light source 124, respectively. A detection signal includes an RF signal as an information reproduction signal, a focusing error signal to be used for a focusing control on a light beam spot, and a tracking error signal to be used for a tracking control on the light beam spot.

In each of the above-described information recording and reproduction, stabilizing the power of light emitted from the light source 123 or 124 is necessary for increase of the accuracy of signal processing. A control for stabilizing the optical output power is realized by monitoring light that is emitted from the first light source 123 or the second light source 124 and feeding back a monitoring result. The first and second light reflecting portions 129 and 130, the first and second optical output power detecting portions 131 and 132, and the optical power control portion 133 all of which are provided in the optical pickup apparatus 121 are means for stabilizing the power of light emitted from the first light source 123 or the second light source 124.

Figure 2:
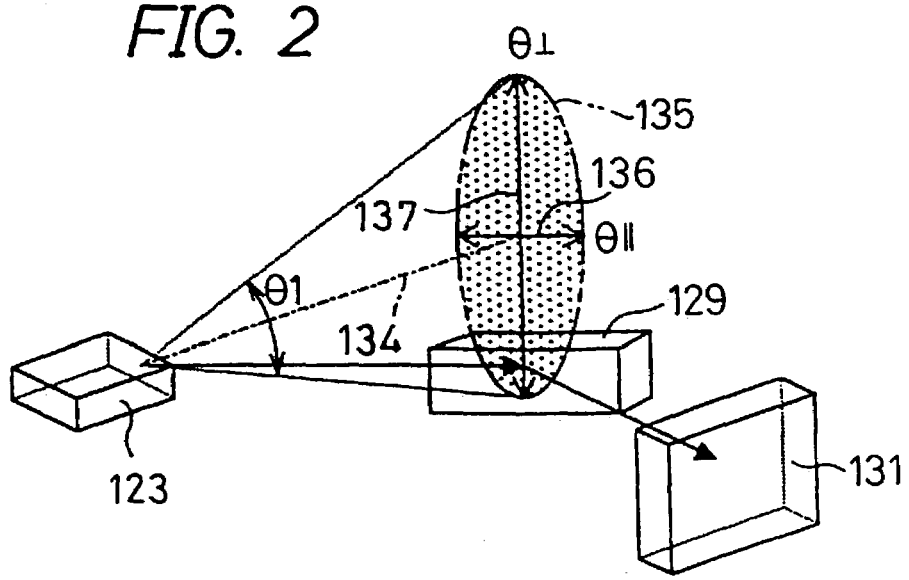
FIG. 2 shows how a light reflecting means is disposed relative to light that is emitted from a light source.

The first light reflecting portion 129 and the second light reflecting portion 130 are reflectors. Each of the first light reflecting portion 129 and the second light reflecting portion 130 is disposed between the first light source 123 or the second light source 124 and the light separation optical element 126, and reflects part of light emitted from the first light source 123 or the second light source 124 and causes it to enter the first optical output power detecting portion 131 or the second optical output power detecting portion 132. FIG. 2 shows how the light reflecting means (specifically, the first light reflecting portion 129) is disposed relative to light that is emitted from the light source (specifically, the first light source 123).

The light emitted from the first light source 123 has spread angles that are associated with two respective orthogonal axes 136 and 137 that are formed on an imaginary plane 135 that is perpendicular to the optical axis 134 of the light emitted from the first light source 123. The first light reflecting portion 129 is disposed on the axis 137 that is associated with a larger spread angle θ1 of the two spread angles. The second light reflecting portion 130 is disposed in the same manner as the first light reflecting portion 129. Since the first light reflecting portion 129 and the second light reflecting portion 130 are disposed in the above manner, the first light reflecting portion 129 or the second light reflecting portion 130 can reflect part, having a larger quantity, of the light emitted from the first light source 123 or the second light source 124 and allow it to be used for the monitoring. Therefore, the optical output power of each of the first light source 123 and the second light source 124 can be controlled with high accuracy.

The first optical output power detecting portion 131 and the second optical output power detecting portion 132, which are light-receiving elements such as photodiodes, detect light that is reflected by the first light reflecting portion 129 or the second light reflecting portion 130 and supplies a detection output to the optical power control portion 133. The optical power control portion 133, which is a control circuit, controls the power of light emitted from the first light source 123 or the second light source 124 in accordance with the detection output of the first optical output power detecting portion 131 or the second optical output power detecting portion 132.

The above-configured optical pickup apparatus 121 can control the optical output power of the light source 123 or 124 with high accuracy without altering the optical system for recording and/or reproducing information on and/or from the optical recording medium 122. Since the first light reflecting portion 129 or the second light reflecting portion 130 are provided between the light separation optical element 126 and the first and second light sources 123 and 124, respectively, the installation capacity can be made smaller and the apparatus can also be made smaller than in the case where they are disposed on the opposite side of the light separation optical element 126 to the light sources 123 and 124. Further, since the optical output power can be monitored by reflecting, with the first light reflecting portion 129 or the second light reflecting portion 130, light that has not passed through or been reflected by the light separation optical element 126, the optical output power of the light source 123 or 124 can be controlled with high accuracy. Although the above embodiment is directed to the optical pickup apparatus 121 having two light sources, the invention can also be applied to an optical pickup apparatus having a single light source, a single light reflecting means, and a single optical output power detecting means.

Figure 3:
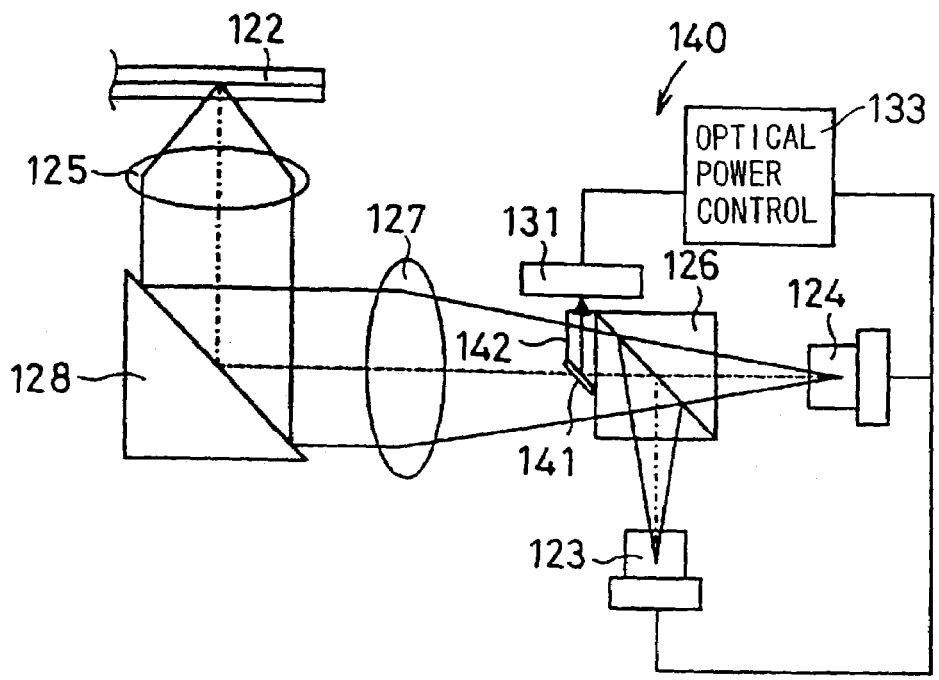
FIG. 3 is a simplified system diagram showing the configuration of an optical pickup apparatus according to a second embodiment of the invention.

FIG. 3 is a simplified system diagram showing the configuration of an optical pickup apparatus 140 according to a second embodiment of the invention. The optical pickup apparatus 140 according to this embodiment is similar to the optical pickup apparatus 121 according to the first embodiment. Components of the former having corresponding components in the latter are given the same reference numerals as the latter and will not be described. In the optical pickup apparatus 140, a reflector 141 as a light reflecting means is attached to the collimator-lens-127-side face of the light separation optical element 126 via an attachment member 142.

In the optical pickup apparatus 140, part of light that is emitted from the first light source 123 and reflected by the light separation optical element 126 and part of light that is emitted from the second light source 124 and transmits the light separation optical element 126 can both be reflected by the single light reflecting means, that is, the reflector 141 and enter a first optical output power detecting portion 131. In this manner, with the single reflector 141 and the single first optical output power detecting portion 131, the optical output power of each of the two light sources, that is, the first light source 123 and the second light source 124, can be controlled via the optical power control portion 133 by monitoring it. Therefore, the number of parts is reduced and the apparatus assembling work is simplified, whereby the efficiency of manufacture can be increased.

Figure 4:
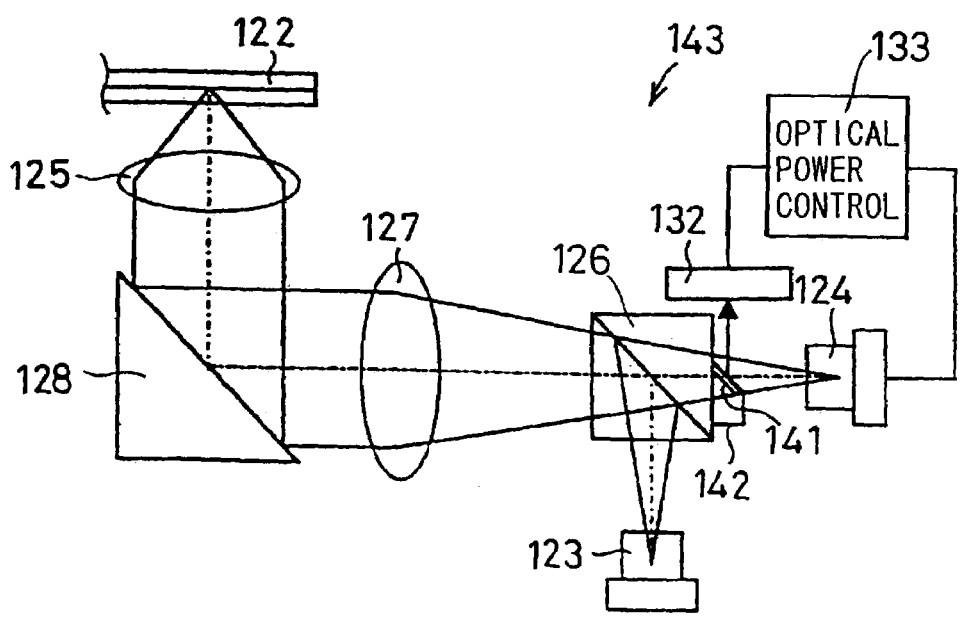
FIG. 4 is a simplified system diagram showing the configuration of an optical pickup apparatus according to a third embodiment of the invention.

FIG. 4 is a simplified system diagram showing the configuration of an optical pickup apparatus 143 according to a third embodiment of the invention. The optical pickup apparatus 143 according to this embodiment is similar to the optical pickup apparatus 140 according to the second embodiment. Components of the former having corresponding components in the latter are given the same reference numerals as the latter and will not be described. In the optical pickup apparatus 143, a reflector 141 as a light reflecting means is attached to the second-light-source-124-side face of the light separation optical element 126 via an attachment member 142. In the optical pickup apparatus 143, part of light that is emitted from the second light source 124 can be reflected by the reflector 141 and enter the second optical output power detecting portion 132. In this manner, with the reflector 141, the optical output power of the second light source 124 can be controlled via the optical power control portion 133 by monitoring it.

Figure 5:
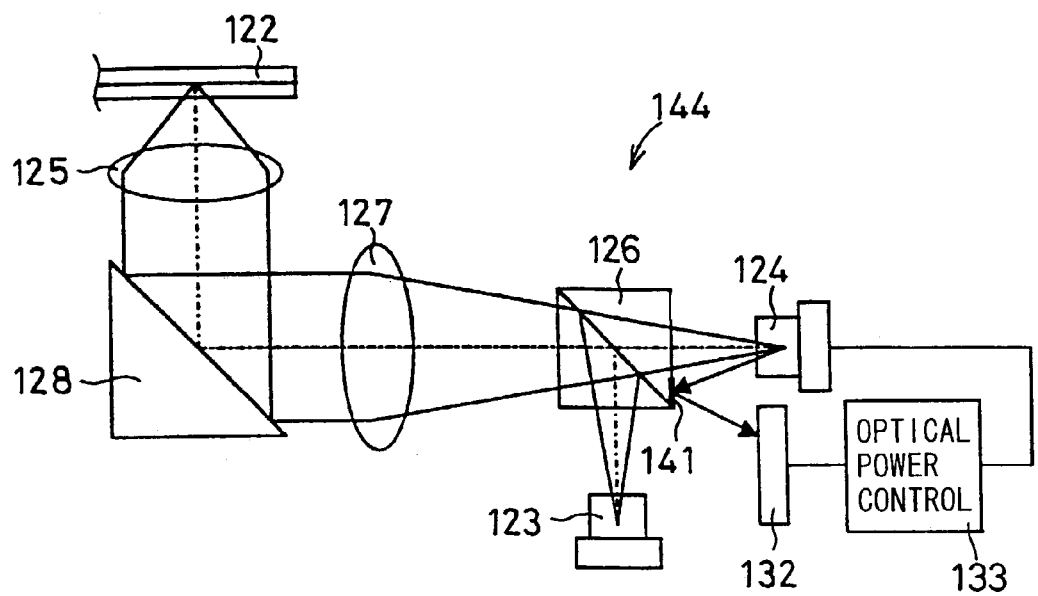
FIG. 5 is a simplified system diagram showing the configuration of an optical pickup apparatus according to a fourth embodiment of the invention.

FIG. 5 is a simplified system diagram showing the configuration of an optical pickup apparatus 144 according to a fourth embodiment of the invention. The optical pickup apparatus 144 according to this embodiment is similar to the optical pickup apparatus 140 according to the second embodiment. Components of the former having corresponding components in the latter are given the same reference numerals as the latter and will not be described. In the optical pickup apparatus 144, a reflector 141 as a light reflecting means is directly attached to the second-light-source 124-side face of the light separation optical element 126. In the optical pickup apparatus 144, part of light that is emitted from the second light source 124 can be reflected by the reflector 141 and enter the second optical output power detecting portion 132. In this manner, with the reflector 141, the optical output power of the second light source 124 can be controlled via the optical power control portion 133 by monitoring it.

In the above optical pickup apparatuses 140, 143, and 144 according to the second to fourth embodiments, since the reflector 141 as the light reflecting means is attached to the light separation optical element 126, a large-capacity space is not necessary for setting of the reflector 141, which contributes to miniaturization of the apparatus.

Figure 6:
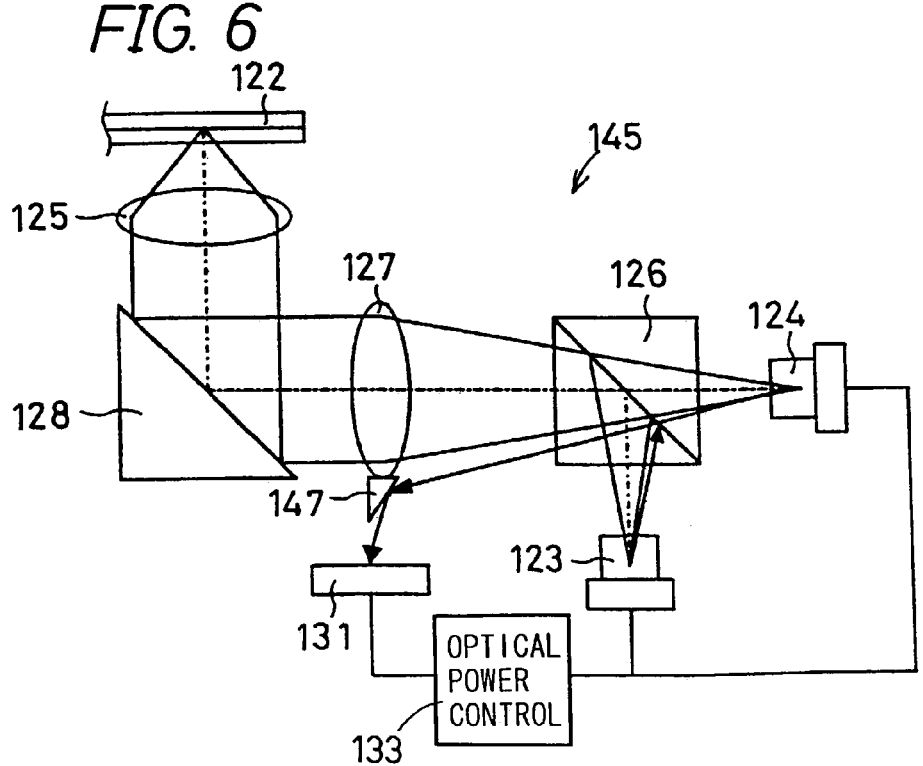
FIG. 6 is a simplified system diagram showing the configuration of an optical pickup apparatus according to a fifth embodiment of the invention.
Figure 7:
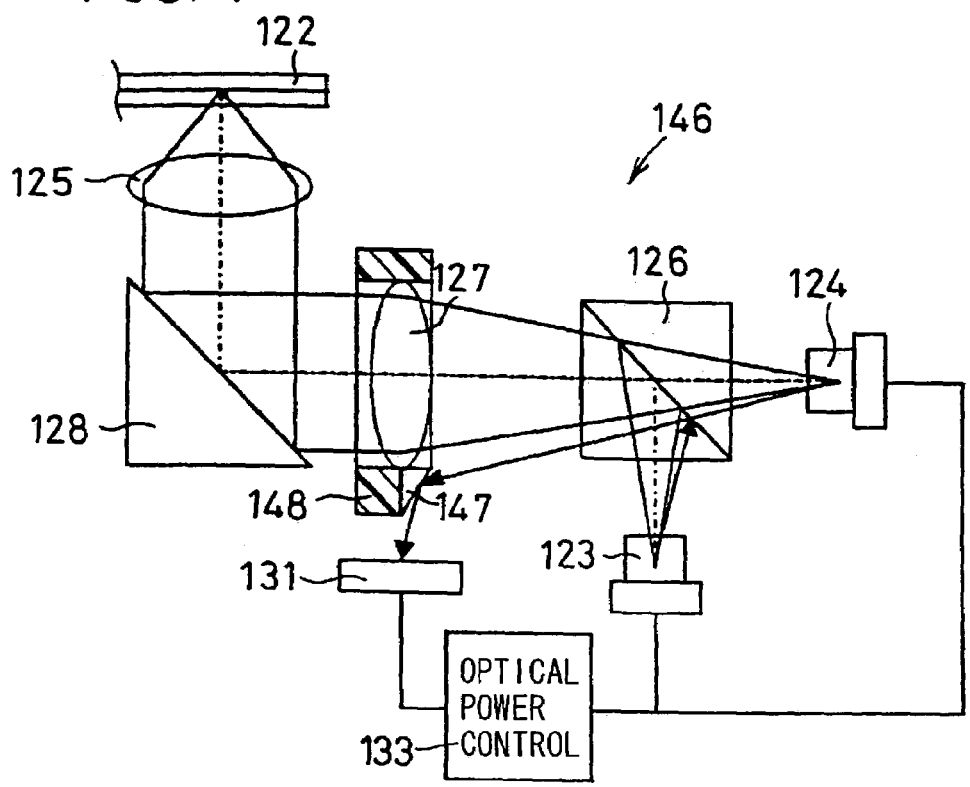
FIG. 7 is a simplified system diagram showing the configuration of an optical pickup apparatus according to a sixth embodiment of the invention.

FIG. 6 is a simplified system diagram showing the configuration of an optical pickup apparatus 145 according to a fifth embodiment of the invention, and FIG. 7 is a simplified system diagram showing the configuration of an optical pickup apparatus 146 according to a sixth embodiment of the invention. The optical pickup apparatuses 145 and 146 according to the fifth and sixth embodiments are similar to the optical pickup apparatus 121 according to the first embodiment. Components of the former having corresponding components in the latter are given the same reference numerals as the latter and will not be described. In the optical pickup apparatus 145 according to the fifth embodiment, a reflector 147 as a light reflecting means is attached to the collimator lens 127. In the optical pickup apparatus 146 according to the sixth embodiment, a reflector 147 as a light reflecting means is attached to a holding member 148 that holds the collimator lens 127.

In the optical pickup apparatuses 145 and 146 according to the fifth and sixth embodiments, part of light that is emitted from the first light source 123 and reflected by the light separation optical element 126 and part of light that is emitted from the second light source 124 and passes through the light separation optical element 126 can both be reflected by the single reflector 147 and enter the first optical output power detecting portion 131. In this manner, with the single reflector 147 and the single first optical output power detecting portion 131, the optical output power of each of the two light sources, that is, the first light source 123 and the second light source 124, can be controlled via the optical power control portion 133 by monitoring it.

Therefore, the number of parts is reduced and the apparatus assembling work is simplified, whereby the efficiency of manufacture can be increased. Further, since the reflector 147 is attached to the collimator lens 127 or the holding member 148 that holds the collimator lens 127, a large-capacity space is not necessary for setting of the reflector 147, which contributes to miniaturization of the apparatus.

Figure 8:
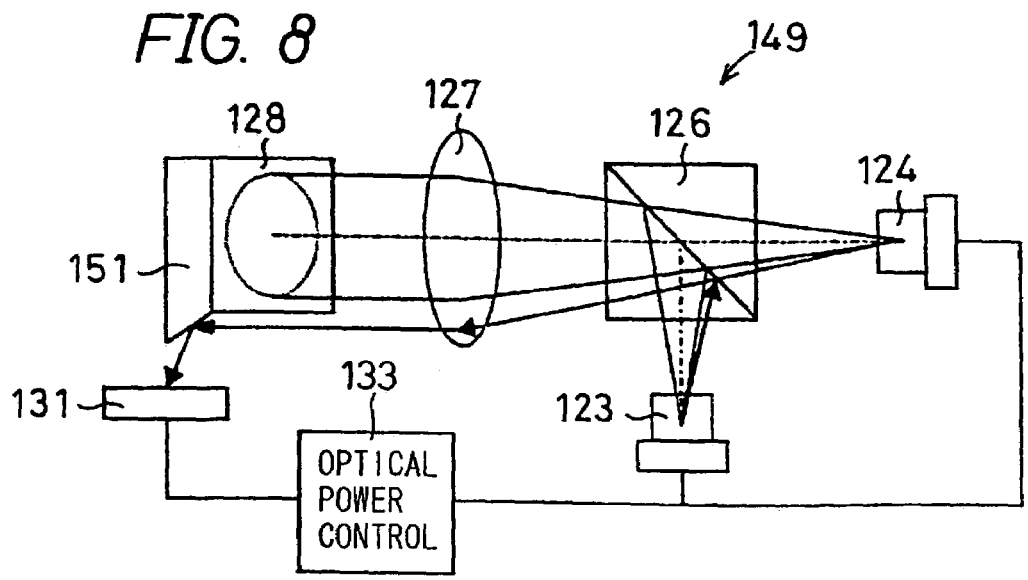
FIG. 8 is a simplified system diagram showing the configuration of an optical pickup apparatus according to a seventh embodiment of the invention.
Figure 9:
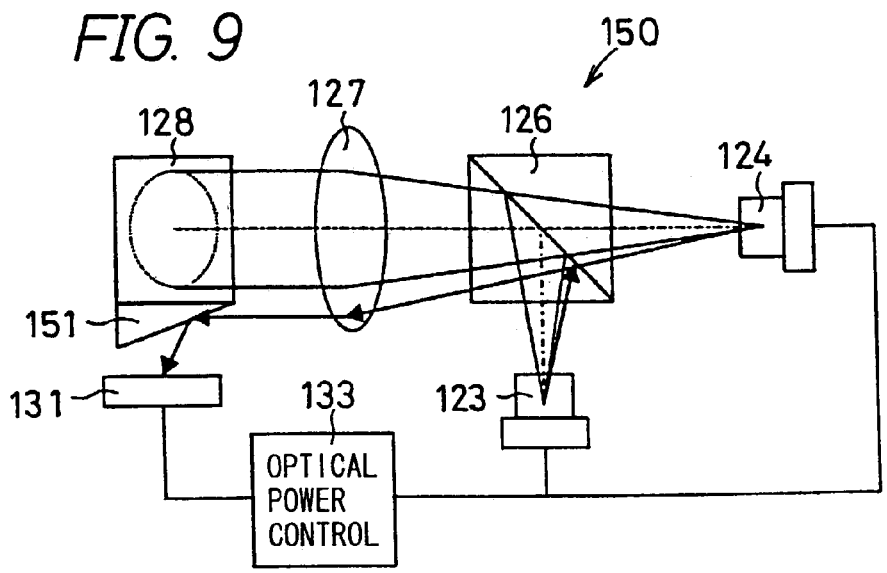
FIG. 9 is a simplified system diagram showing the configuration of an optical pickup apparatus according to an eighth embodiment of the invention.

FIG. 8 is a simplified system diagram showing the configuration of an optical pickup apparatus 149 according to a seventh embodiment of the invention, and FIG. 9 is a simplified system diagram showing the configuration of an optical pickup apparatus 150 according to an eighth embodiment of the invention. The optical pickup apparatuses 149 and 150 according to the seventh and eighth embodiments are similar to the optical pickup apparatus 121 according to the first embodiment. Components of the former having corresponding components in the latter are given the same reference numerals as the latter and will not be described. In FIGS. 8 and 9, the upward-directing mirror as the optical path changing reflector 128 is seen from the side where the objective lens 125 exists. To avoid unduly complicating FIGS. 8 and 9, the objective lens 125 and the optical recording medium 122 are omitted in those drawings.

In the optical pickup apparatuses 149 and 150 according to the seventh and eighth embodiments, a reflector 151 as a light reflecting means is attached to the upward-directing mirror 128. Part of light that is emitted from the first light source 123 and reflected by the light separation optical element 126 and part of light that is emitted from the second light source 124 and passes through the light separation optical element 126 pass through the collimator lens 127, are reflected by the reflector 151, and enter the first optical output power detecting portion 131.

In this manner, with the single reflector 151 and the single first optical output power detecting portion 131, the optical output power of each of the two light sources, that is, the first light source 123 and the second light source 124, can be controlled via the optical power control portion 133 by monitoring it. Therefore, the number of parts is reduced and the apparatus assembling work is simplified, whereby the efficiency of manufacture can be increased. Further, since the reflector 151 is attached to the upward-directing mirror 128, a large-capacity space is not necessary for setting of the reflector 151, which contributes to miniaturization of the apparatus.

Figure 10:
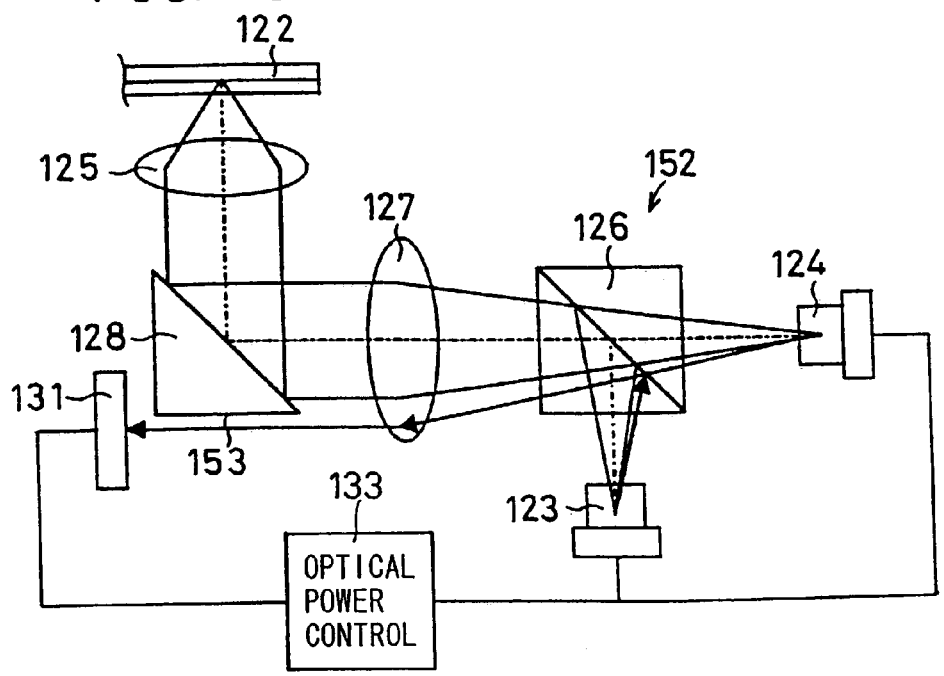
FIG. 10 is a simplified system diagram showing the configuration of an optical pickup apparatus according to a ninth embodiment of the invention.

FIG. 10 is a simplified system diagram showing the configuration of an optical pickup apparatus 152 according to a ninth embodiment of the invention. The optical pickup apparatus 152 according to the ninth embodiment is similar to the optical pickup apparatus 121 according to the first embodiment. Components of the former having corresponding components in the latter are given the same reference numerals as the latter and will not be described.

The optical pickup apparatus 152 according to the ninth embodiment is not equipped with any light reflecting means. Part of light that is emitted from the first light source 123 and reflected by the light separation optical element 126 and part of light that is emitted from the second light source 124 and passes through the light separation optical element 126 pass through the collimator lens 127 and enter the first optical output power detecting portion 131 without shining on the upward-directing mirror 128 (i.e., they go by (parallel with) a side face 153 of the upward-directing mirror 128).

In this manner, without any light reflecting means, the optical output power of each of the two light sources, that is, the first light source 123 and the second light source 124, can be controlled via the optical power control portion 133 by monitoring it only with the single first optical output power detecting portion 131. Therefore, the number of parts is reduced and the apparatus assembling work is simplified, whereby the efficiency of manufacture can be increased. Further, since number of parts is reduced, the capacity of a space that is necessary for setting of the parts is reduced, which contributes to miniaturization of the apparatus.

Figure 11:
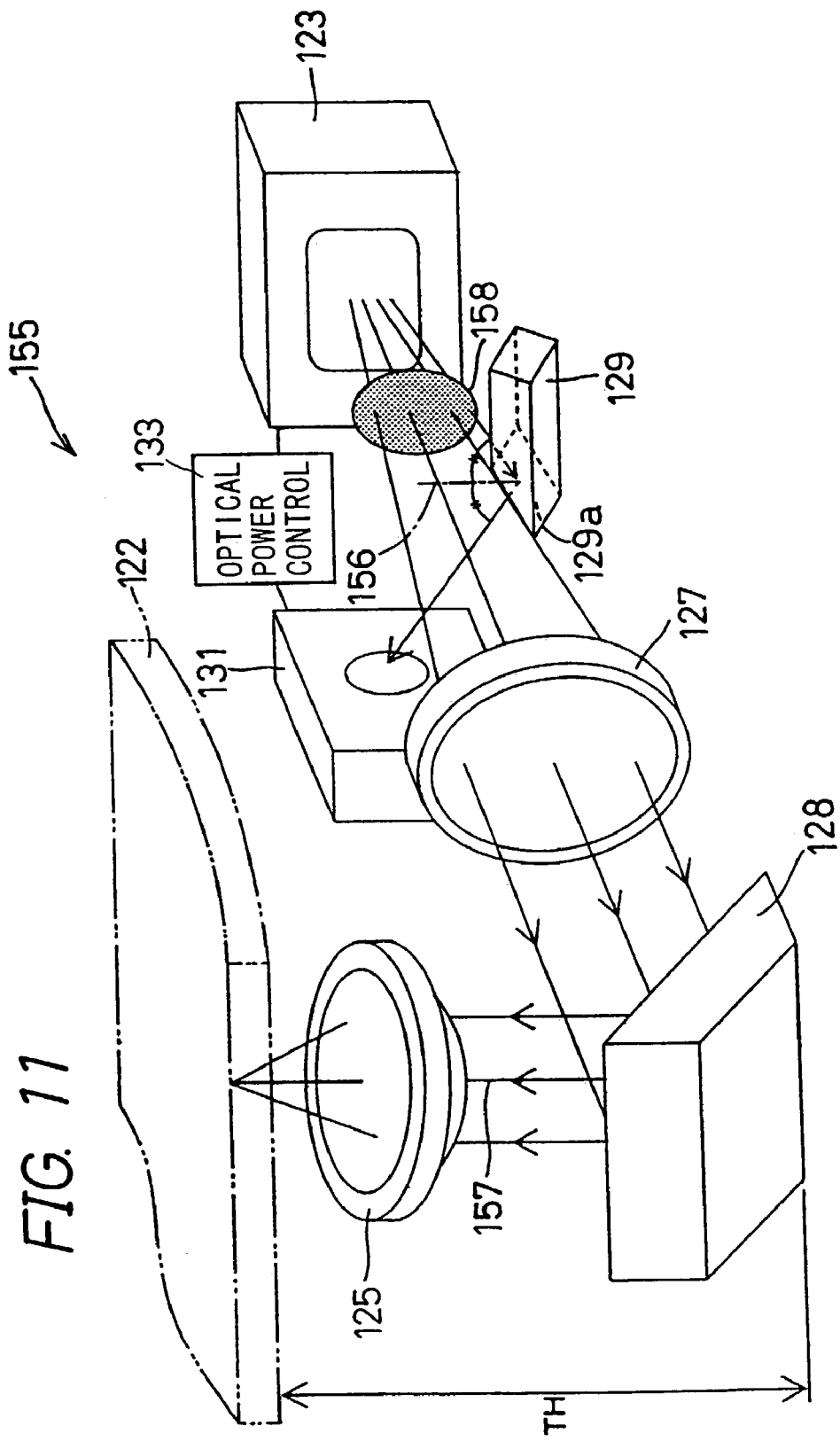
FIG. 11 is a simplified perspective view showing the configuration of an optical pickup apparatus according to a 10th embodiment of the invention.

FIG. 11 is a simplified perspective view showing the configuration of an optical pickup apparatus 155 according to a 10th embodiment of the invention. The optical pickup apparatus 155 according to the 10th embodiment is similar to the optical pickup apparatus 121 according to the first embodiment. Components of the former having corresponding components in the latter are given the same reference numerals as the latter and will not be described. An important feature of the optical pickup apparatus 155 according to this embodiment is that the normal 156 to the reflecting surface 129a of the first light reflecting portion 129 is not parallel with the optical axis 157 of light that is reflected from the upward-directing mirror 128 toward the optical recording medium 122.

To meet requirements of miniaturization and thickness reduction, in the optical pickup apparatus 155, the individual members are arranged so as to reduce the distance TH between the bottom surface of the optical recording medium 122 and that of the upward-directing mirror 128, that is, the thickness of the apparatus. The thickness of the apparatus can be reduced by setting the normal 156 of the first light reflecting portion 129 not parallel with the optical axis 157, preferably, perpendicularly to the optical axis 157.

Since the light source 123 is oriented so that a spread 158 of light emitted from the light source 123 has the above-mentioned larger spread angle $\theta 1$ in the direction of the thickness TH of the apparatus, at the position of the collimator lens 127 the diameter of the diverging light corresponding to the larger spread angle $\theta 1$ is larger than that of the collimator lens 127. Therefore, part of the light emitted from the light source 123 does not enter the circular collimator lens 127. In the optical pickup apparatus 155, the first light reflecting portion 129 is set on the axis on which the light emitted from the light source 123 forms the larger spread angle $\theta 1$ so that, as described above, the normal 156 to the reflecting surface 129a is not parallel with the optical axis 157. And light that does not enter the collimator lens 127, that is, light that is not used for information recording or reproduction is used for the optical power control by reflecting it with the first light reflecting portion 129 so that it shines on the first optical output power detecting portion 131. In this manner, both of efficient utilization of light emitted from the light source 123 and thickness reduction of the apparatus can be attained.

Although FIG. 11 shows the configuration that the single first light source 123 and the single first light reflecting portion 129 are provided, a double-wavelength optical pickup apparatus that is equipped with first and second light sources that emit light beams having different wavelengths can provide the same advantages as the optical pickup apparatus 155 according to the 10th embodiment does by setting first and second light reflecting portions for the respective light sources in such a manner that the normals to the respective reflecting surfaces are not parallel with the optical axis of light that is reflected from the upward-directing mirror toward the optical recording medium.

Figure 12:
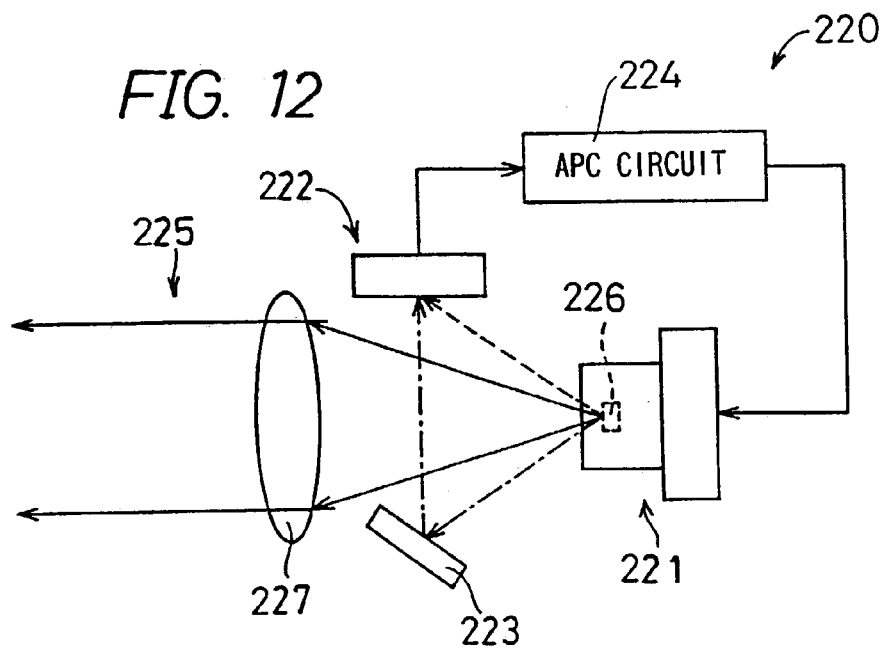
FIG. 12 is a simplified system diagram showing the configuration of an important part of an optical pickup apparatus according to an 11th embodiment of the invention.

FIG. 12 is a simplified system diagram showing the configuration of an important part of an optical pickup apparatus 220 according to an 11th embodiment of the invention. The optical pickup apparatus 220, which is an apparatus for recording or reproducing information on or from an optical recording medium, is provided with a light source 221 for emitting light; a light detecting means 222 for detecting part of the light emitted from the light source 221; a light collecting means 223 for directing, to the light detecting means 222, part of the light emitted from the light source 221 that is not used for information recording or reproduction; a control means 224 for controlling the power of the light emitted from the light source 221 in accordance with an output of the light detecting means 222; a light receiving portion for reading information by receiving light reflected from the optical recording medium; and a focusing optical system 225 disposed between the optical recording medium and the light source 221, for focusing light originating from the light source 221 on the optical recording medium and for focusing the light reflected from the optical recording medium.

The light source 221 is a semiconductor laser 221, and a semiconductor laser chip 226 provided in the semiconductor laser 221 emits light toward the optical recording medium. Most of the light emitted from the light source 221 enters the focusing optical system 225 and is used for recording or reproducing information on or from the optical recording medium. The remaining light that does not enter the focusing optical system 225 and is not used for information recording or reproduction goes outward.

The light detecting means 222 has a photodiode and a signal amplifying portion as a signal amplifying means. The photodiode as a photodetecting element receives and detects part of light (for convenience, hereinafter called "outgoing light") that is emitted from the semiconductor laser chip 226, goes outward instead of entering the focusing optical system 225 and converts the detected light into a current or voltage signal to output the signal. The signal amplifying portion amplifies the signal outputted from the photodiode. The structure that the photodiode and the signal amplifying portion are integrated into a single part contributes to miniaturization of the optical pickup apparatus 220. Alternatively, the photodiode and the signal amplifying portion may be independent parts.

The control means 224 is an APC circuit 224. Current signals (or voltage signals) as references to be used for controlling the output power of the semiconductor laser chip 226 are set and stored in advance in a memory of the APC circuit 224 on the basis of light quantities that are necessary for recording and reproducing information on and from the optical recording medium, respectively. By comparing a current signal that is output from the light detecting means 222 with a current signal that is used as a reference for a control depending on an operation state of the optical pickup apparatus 220, the APC circuit 224 judges whether the output power of the semiconductor laser chip 226 is sufficient or insufficient and controls the output power of the semiconductor laser chip 226 by supplying the semiconductor laser 221 with a signal for controlling the drive current of the semiconductor laser chip 226. The light collecting means 223, which is a reflecting mirror 223, reflects, toward the light detecting means 222, part of the outgoing light that goes in a direction that is different from the direction toward the light detecting means 222 and that does not enter the focusing optical system 225 and is not used for information recording or reproduction.

The light receiving portion receives light reflected from the optical recording medium and converts it into a current signal (i.e., a detection signal of the reflection light) corresponding to the quantity of the received light. The focusing optical system 225 includes a collimator lens 227, an upward-directing mirror, an objective lens, and a focusing lens, and focuses light originating from the semiconductor laser chip 226 on the optical recording medium and focuses light reflected from the optical recording medium on the light receiving portion. The light receiving portion may be integrated with the semiconductor laser 221 into a light-emitting/receiving unit or be an independent part that is separated from the semiconductor laser 221.

Most of light emitted from the semiconductor laser chip 226 enters the focusing optical system 225 and is used for recording or reproducing information on or from the optical recording medium. Part of outgoing light that goes in the direction that is different from the direction toward the light detecting means 222 is reflected by the reflecting mirror 223 toward the light detecting means 222, and received by the light detecting means 222 together with another part of the outgoing light that directly shines on the light detecting means 222. The light received by the light detecting means 222 is detected by the photodiode and converted into a current signal to output the current signal. The current signal thus output from the photodiode is amplified by the signal amplifying portion and output to the APC circuit 224.

The APC circuit 224 reads, from the memory, a preset current signal to be used as a reference for a control, and compares the current signal that is output from the light detecting means 222 with the read-out current signal. The APC circuit 224 controls the output power of the semiconductor laser 221 to a constant value by supplying a signal for controlling the drive current of the semiconductor laser chip 226 to the semiconductor laser 221 in accordance with a comparison result.

Figure 13:
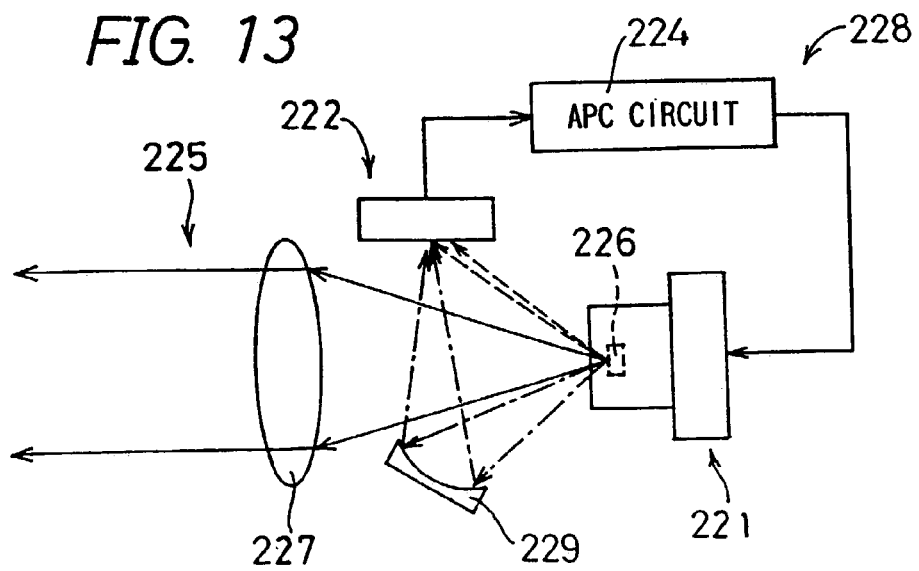
FIG. 13 is a simplified system diagram showing the configuration of an important part of an optical pickup apparatus according to a 12th embodiment of the invention.

FIG. 13 is a simplified system diagram showing the configuration of an important part of an optical pickup apparatus 228 according to a 12th embodiment of the invention. The optical pickup apparatus 228 according to this embodiment is similar to the optical pickup apparatus 220 according to the 11th embodiment. Components of the former having corresponding components in the latter are given the same reference numerals as the latter and will not be described. An important feature of the optical pickup apparatus 228 is that a light collecting means 229 is a concave reflecting mirror 229.

The concave reflecting mirror 229 is a reflector that reflects incident light while focusing it with its concave surface. Part of outgoing light that goes in a direction that is different from the direction toward the light detecting means 222 shines on the concave surface of the concave reflecting mirror 229 and is reflected by the concave surface toward the light detecting means 222 while being focused. The light that has been reflected and focused and another part of the outgoing light that directly shines on the light detecting means 222 are received by the light detecting means 222, and a resulting current signal is used for an output power control on the semiconductor laser chip 226.

Figure 14:
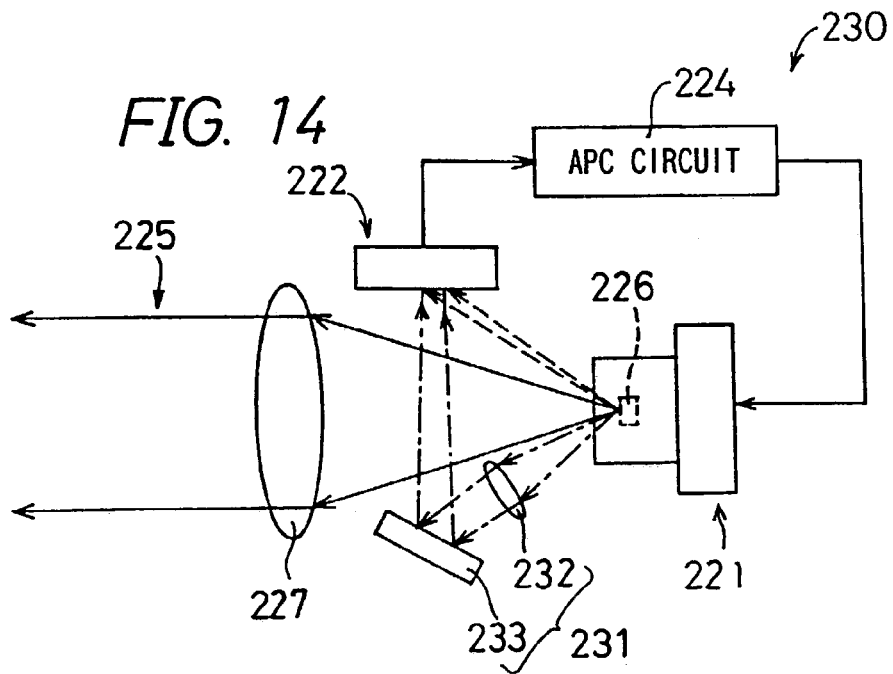
FIG. 14 is a simplified system diagram showing the configuration of an important part of an optical pickup apparatus according to a 13th embodiment of the invention.

FIG. 14 is a simplified system diagram showing the configuration of an important part of an optical pickup apparatus 230 according to a 13th embodiment of the invention. The optical pickup apparatus 230 according to this embodiment is similar to the optical pickup apparatus 220 according to the 11th embodiment. Components of the former having corresponding components in the latter are given the same reference numerals as the latter and will not be described. An important feature of the optical pickup apparatus 230 is that a light collecting means 231 consists of a focusing lens 232 for focusing part of outgoing light emitted from the semiconductor laser chip 226 and a reflecting mirror 233 for reflecting, toward the light detecting means 222, converging light produced by the focusing lens 232.

Part of outgoing light that goes in a direction that is different from the direction toward the light detecting means 222 is focused by the focusing lens 232 and reflected by the reflecting mirror 233 toward the light detecting means 222. The reflected light that is in a converging state and another part of the outgoing light that directly shines on the light detecting means 222 are received by the light detecting means 222, and a resulting current signal is used for an output power control on the semiconductor laser chip 226.

Figure 15:
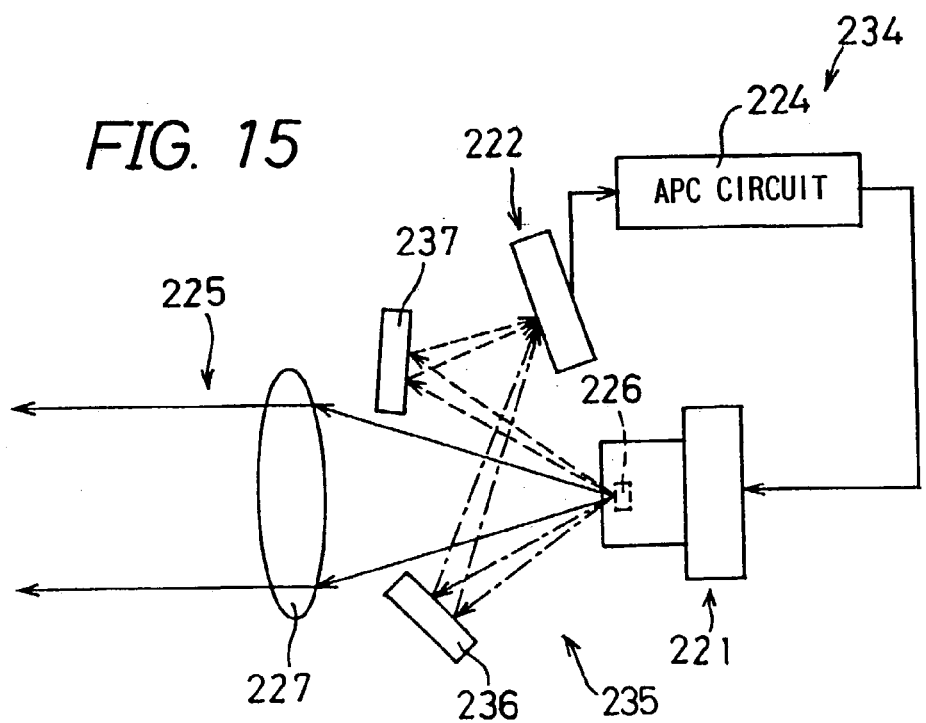
FIG. 15 is a simplified system diagram showing the configuration of an important part of an optical pickup apparatus according to a 14th embodiment of the invention.

FIG. 15 is a simplified system diagram showing the configuration of an important part of an optical pickup apparatus 234 according to a 14th embodiment of the invention. The optical pickup apparatus 234 according to this embodiment is similar to the optical pickup apparatus 220 according to the 11th embodiment. Components of the former having corresponding components in the latter are given the same reference numerals as the latter and will not be described. An important feature of the optical pickup apparatus 234 is that a light collecting means 235 consists of a first reflecting mirror 236 and a second reflecting mirror 237 for reflecting, toward the light detecting means 222, part of light that is emitted from the semiconductor laser chip 226.

Parts of outgoing light are reflected by the first reflecting mirror 236 and the second reflecting mirror 237 toward the light detecting means 222. The reflected light beams are received by the light detecting means 222, and a resulting current signal is used for an output power control on the semiconductor laser chip 226.

Figure 16:
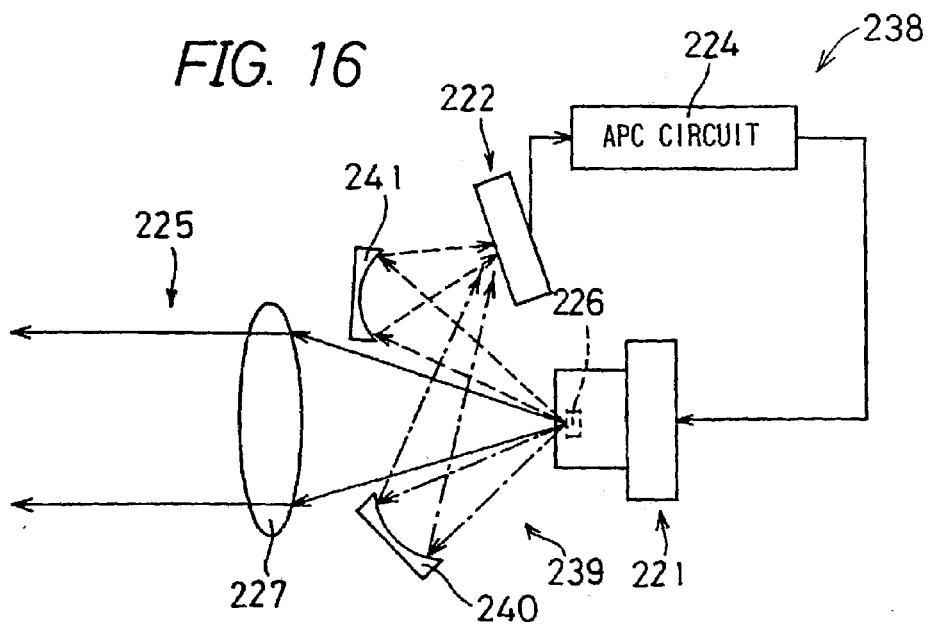
FIG. 16 is a simplified system diagram showing the configuration of an important part of an optical pickup apparatus according to a 15th embodiment of the invention.

FIG. 16 is a simplified system diagram showing the configuration of an important part of an optical pickup apparatus 238 according to a 15th embodiment of the invention. The optical pickup apparatus 238 according to this embodiment is similar to the optical pickup apparatus 224 according to the 14th embodiment. Components of the former having corresponding components in the latter are given the same reference numerals as the latter and will not be described. An important feature of the optical pickup apparatus 238 is that a light collecting means 239 consists of a first concave reflecting mirror 240 and a second concave reflecting mirror 241.

Parts of outgoing light are reflected and focused by the first concave reflecting mirror 240 and the second concave reflecting mirror 241 toward the light detecting means 222. The reflected light beams are in a converging state and hence are received by the light detecting means 222 without being reduced in light quantity, and a resulting current signal is used for an output power control on the semiconductor laser chip 226.

Figure 17:
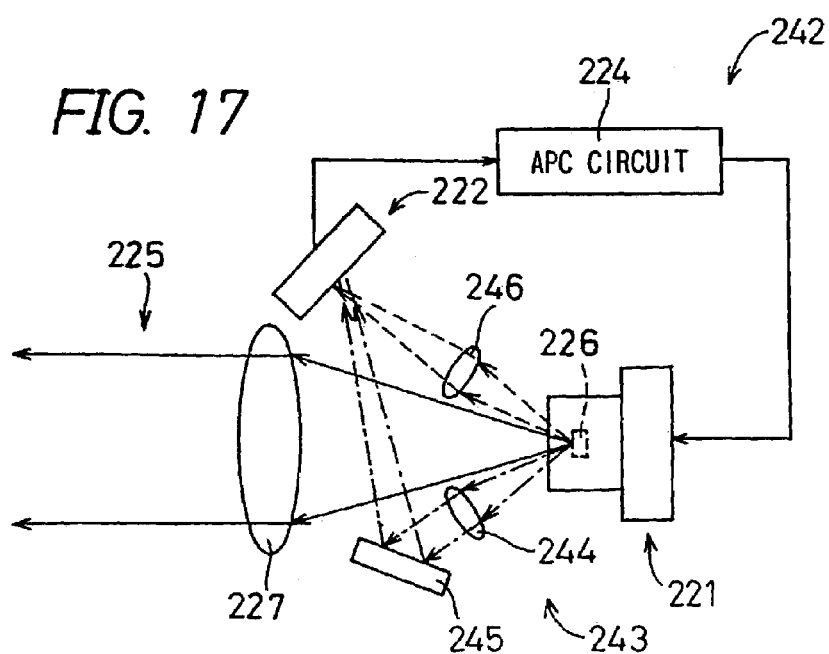
FIG. 17 is a simplified system diagram showing the configuration of an important part of an optical pickup apparatus according to a 16th embodiment of the invention.

FIG. 17 is a simplified system diagram showing the configuration of an important part of an optical pickup apparatus 242 according to a 16th embodiment of the invention. The optical pickup apparatus 242 is similar to the optical pickup apparatus 220 according to the 11th embodiment. Components of the former having corresponding components in the latter are given the same reference numerals as the latter and will not be described. An important feature of the optical pickup apparatus 242 is that a light collecting means 243 consists of a first focusing lens 244 for focusing part of outgoing light emitted from the semiconductor laser chip 226, a reflecting mirror 245 for reflecting, toward the light detecting means 222, converging light produced by the first focusing lens 244, and a second focusing lens 246 for focusing another part of the outgoing light emitted from the semiconductor laser chip 226 on the light detecting means 222.

Part of outgoing light that goes in a direction different from the direction toward the light detecting means 222 is focused by the first focusing lens 244 and reflected by the reflecting mirror 245 toward the light detecting means 222. Another part of the outgoing light that goes toward the light detecting means 222 is focused on the light detecting means 222 by the second focusing lens 246. The light reflected from the reflecting mirror 245 and the light focused by the second focusing lens 246 are received by the light detecting means 222 without being reduced in light quantity, and a resulting current signal is used for an output power control on the semiconductor laser chip 226.

Figure 18:
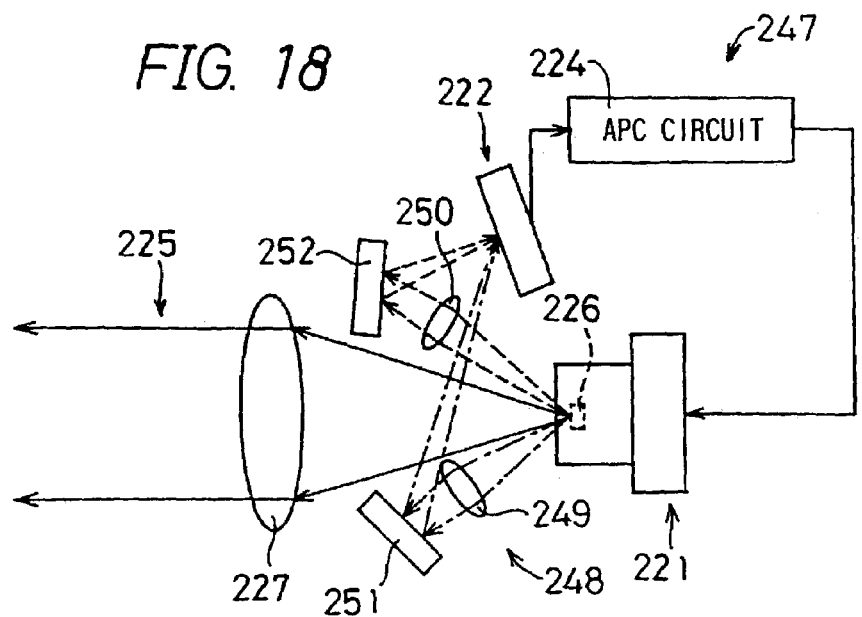
FIG. 18 is a simplified system diagram showing the configuration of an important part of an optical pickup apparatus according to a 17th embodiment of the invention.

FIG. 18 is a simplified system diagram showing the configuration of an important part of an optical pickup apparatus 247 according to a 17th embodiment of the invention. The optical pickup apparatus 247 according to this embodiment is similar to the optical pickup apparatus 220 according to the 11th embodiment. Components of the former having corresponding components in the latter are given the same reference numerals as the latter and will not be described. An important feature of the optical pickup apparatus 247 is that a light collecting means 248 consists of a first focusing lens 249 and a second focusing lens 250 for focusing parts of outgoing light emitted from the semiconductor laser chip 226, a first reflecting mirror 251 for reflecting, toward the light detecting means 222, converging light produced by the first focusing lens 249, and a second reflecting mirror 252 for reflecting, toward the light detecting means 222, converging light produced by the second focusing lens 250.

Part of outgoing light is focused by the first focusing lens 249 and reflected by the first reflecting mirror 251 toward the light detecting means 222. Another part of the outgoing light that goes in a direction different than the above part of the outgoing light does is focused by the second focusing lens 250 and reflected by the second reflecting mirror 252 toward the light detecting means 222. The light beams reflected from the first reflecting mirror 251 and the second reflecting mirror 252 are received by the light detecting means 222 without being reduced in light quantity, and a resulting current signal is used for an output power control on the semiconductor laser chip 226.

As described above, according to the 11th to 17th embodiments of the invention, the light detecting means 222 receives light that directly shines on it and is not used for information recording or reproduction and light that is directed to it by the light collecting means 223, 229, 231, 235, 239, 243, or 248. Therefore, the quantity of light that is used for an output power control on the semiconductor laser chip 226 can be increased, which makes it possible to control the output power of the semiconductor laser chip 226 with high accuracy. Further, since outgoing light that is emitted from the semiconductor laser chip 226 but is not used for information recording or reproduction is used for an output power control, the quantity of light that is emitted from the semiconductor laser chip 226 and is used for information recording or reproduction is not reduced and hence the efficiency of utilization of light can be increased.

Figure 19:
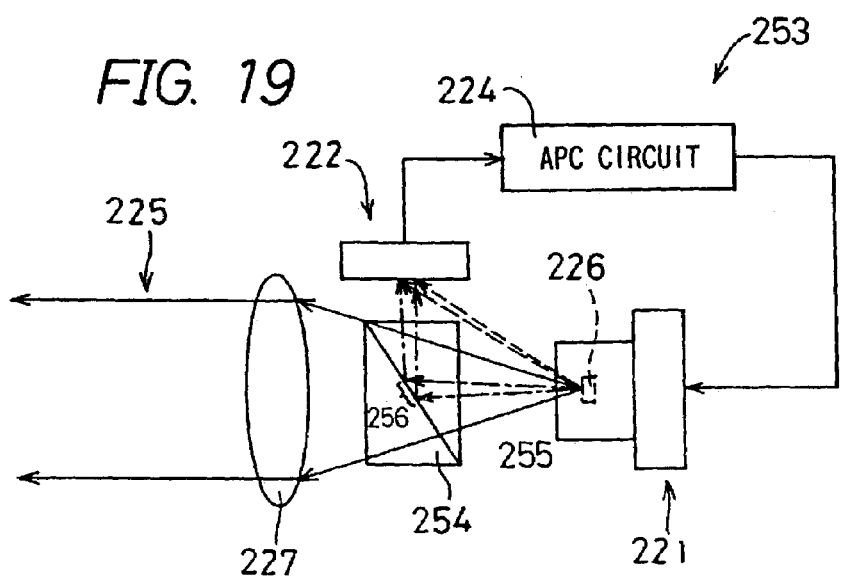
FIG. 19 is a simplified system diagram showing the configuration of an important part of an optical pickup apparatus according to an 18th embodiment of the invention.

FIG. 19 is a simplified system diagram showing the configuration of an important part of an optical pickup apparatus 253 according to an 18th embodiment of the invention. The optical pickup apparatus 253 according to this embodiment is similar to the optical pickup apparatus 220 according to the 11th embodiment. Components of the former having corresponding components in the latter are given the same reference numerals as the latter and will not be described. An important feature of the optical pickup apparatus 253 is that it has a light separating means 254 for separating part of light that is emitted from the semiconductor laser chip 226 and enters the focusing optical system 225 so as to be used for information recording or reproduction, and for directing the separated light to the light detecting means 222.

The light separating means 254 is a beam splitter 254 having a light separating surface 255 in which the reflectance of a certain portion is different from that of the other portion. The reflectance distribution of the light separating surface 255 is determined in such a range that the quantity of light that passes through the light separating surface 255 is larger than a value that is necessary for information recording and reproduction. In the beam splitter 254 according to this embodiment, so that light (about 2%) incident on a central portion 256 of the light separating surface 255 is reflected and the remaining light (about 98%) incident on the portion other than the central portion 256 is transmitted, the central portion 256 is coated with, for example, a single-layer film of a coating material such as magnesium fluoride ($MgF_2$) and the other portion is coated with, for example, a multilayer film in which several coating materials having various refractive indices are laid one on another. This structure facilitates formation of the light separating surface 255 in which the reflectance of a certain portion is different from that of the other portion.

As described above, the light separating surface 255 in which the reflectance of a certain portion is different from that of the other portion by coating with coating materials having different reflectance values. Since the light separating surface 255 can easily be formed in this manner, light to be used for controlling the output power of the semiconductor laser chip 226 can be extracted at a desired ratio from light that is emitted from the semiconductor laser chip 226.

Of light incident on the beam splitter 254 that is part of light emitted from the semiconductor laser chip 226, light (about 2%) incident on the central portion 256 of the light separating surface 255 is reflected toward the light detecting means 222 and the remaining light incident on the portion other than the central portion 256 is transmitted, directed to the optical recording medium, and used or information recording or reproduction. Part of outgoing light that goes toward the light detecting means 222 and the light reflected from the beam splitter 254 are received by the light detecting means 222, and a resulting current signal is used for an output power control on the semiconductor laser chip 226.

Figure 20:
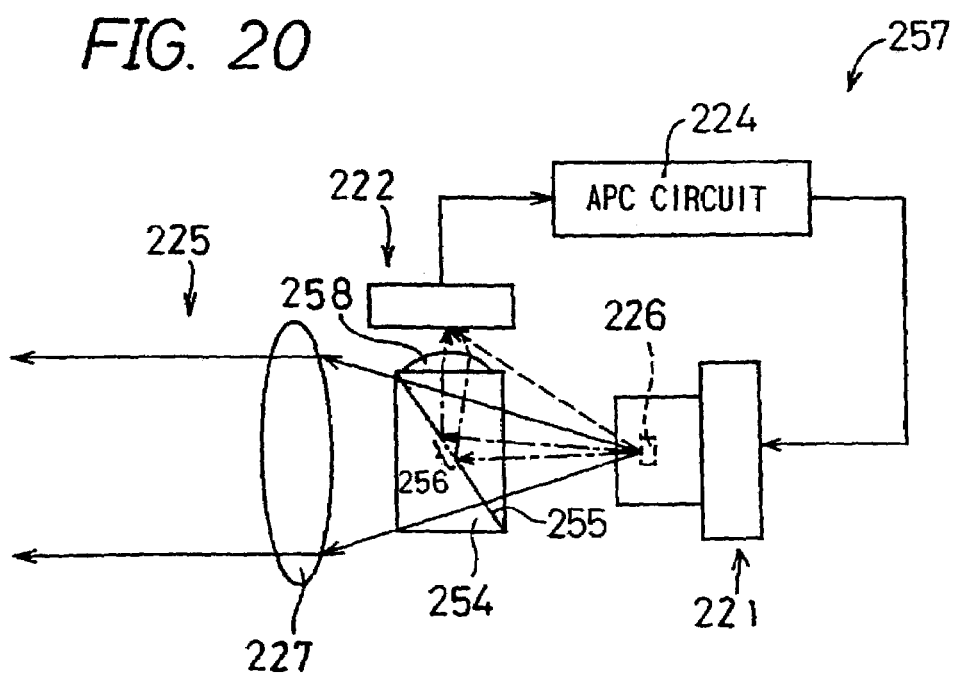
FIG. 20 is a simplified system diagram showing the configuration of an important part of an optical pickup apparatus according to a 19th embodiment of the invention.

FIG. 20 is a simplified system diagram showing the configuration of an important part of an optical pickup apparatus 257 according to a 19th embodiment of the invention. The optical pickup apparatus 257 according to this embodiment is similar to the optical pickup apparatus 253 according to the 18th embodiment. Components of the former having corresponding components in the latter are given the same reference numerals as the latter and will not be described. An important feature of the optical pickup apparatus 257 is that the beam splitter 254 is provided with a condenser lens 258.

The condenser lens 258 is disposed between the light detecting means 222 and the beam splitter 254 and is integral with the beam splitter 254. Part of light emitted from the semiconductor laser chip 256 is reflected by the beam splitter 254, and the reflection light is condensed by the condenser lens 258 and received, together with part of outgoing light that directly shines on the light detecting means 222, by the light detecting means 222 without being reduced in light quantity through divergence. A resulting current signal is used for an output power control on the semiconductor laser chip 226.

Although in this embodiment the condenser lens 258 is integral with the beam splitter 254, it may be separate from the beam splitter 254.

According to the 18th and 19th embodiments of the invention, the light detecting means 222 can receive both of direct incident light that is emitted from the semiconductor laser 226 but is not used for information recording or reproduction and part of light to be used for information recording or reproduction. This increases the quantity of reception light that can be used for the optical power control and thereby increases the accuracy of the optical power control. Further, since light that is emitted from the semiconductor laser 226 but is not used for information recording or reproduction is also used for the output power control, the efficiency of utilization of light can be increased.

Figure 21:
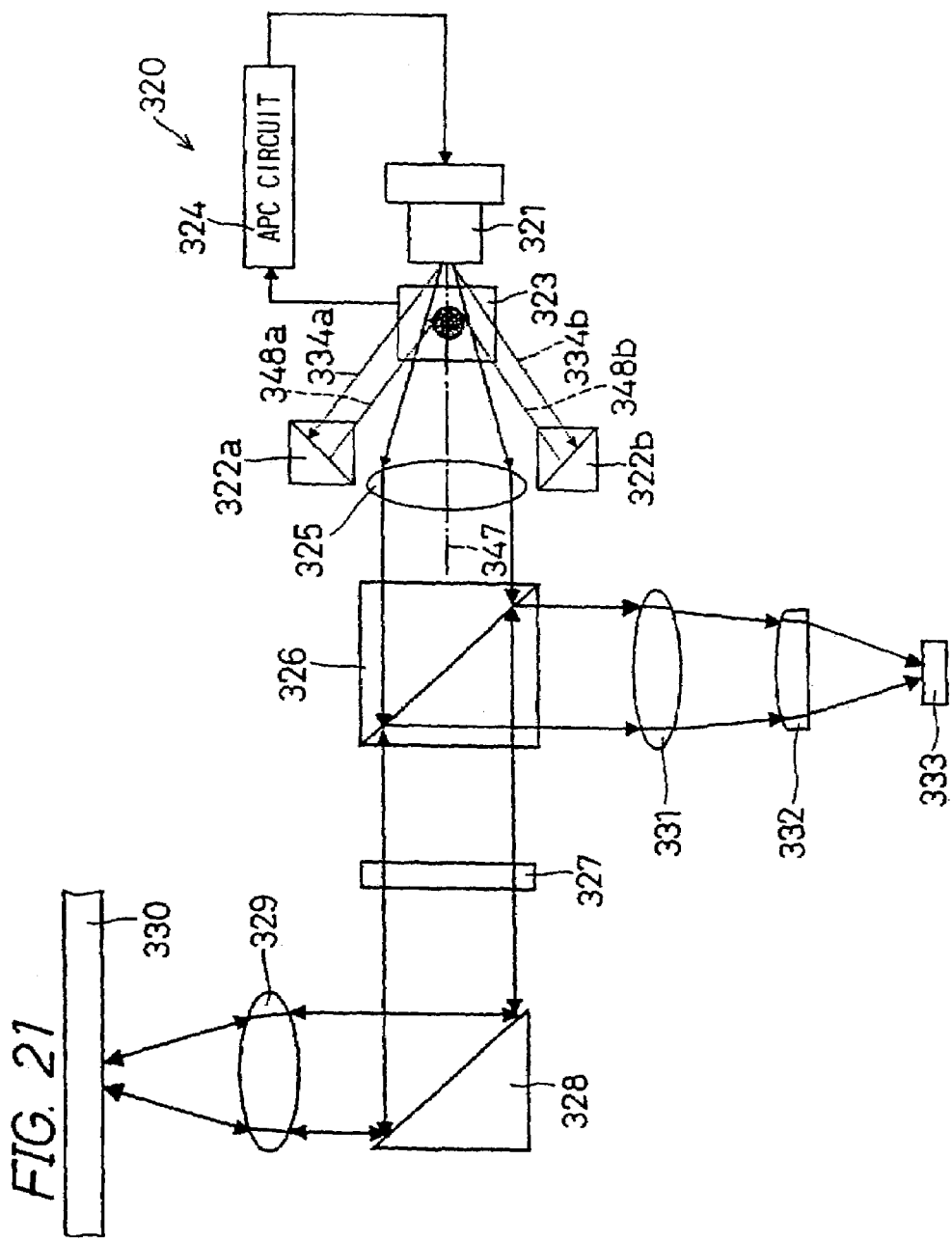
FIG. 21 is a simplified side view showing the arrangement of an optical pickup apparatus according to a 20th embodiment of the invention.
Figure 22:
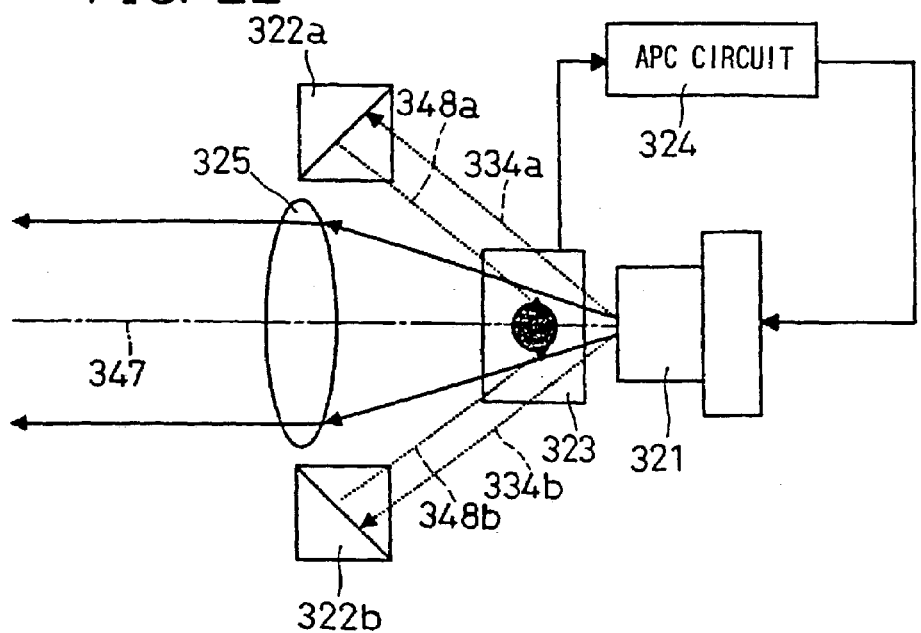
FIGS. 22 and 23 are a side view and a plan view, respectively, showing the arrangement of an important part of the optical pickup apparatus of FIG. 21.
Figure 23:
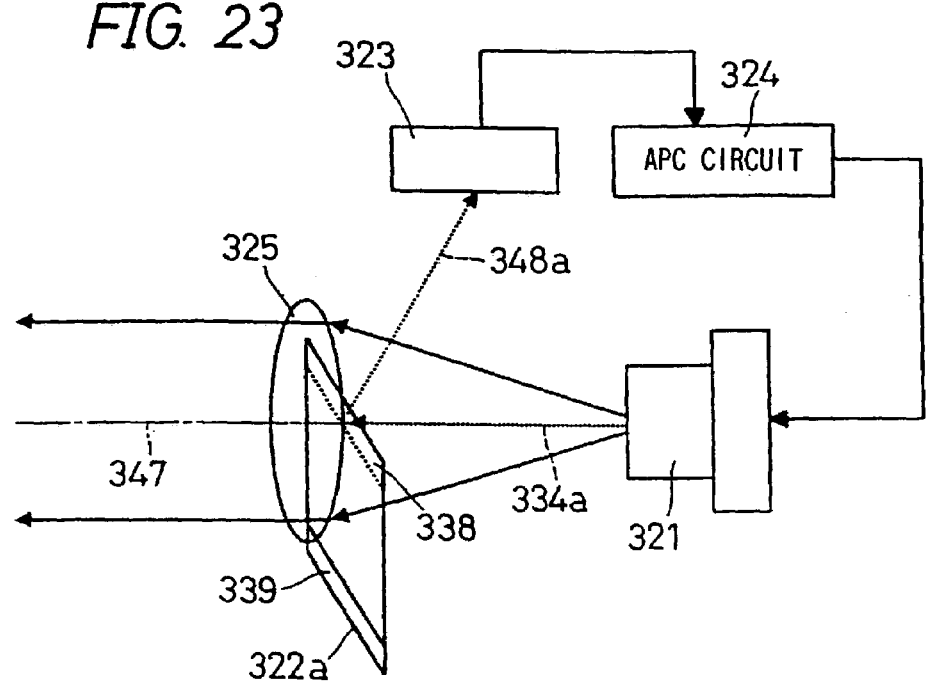

FIG. 21 is a simplified side view showing the arrangement of an optical pickup apparatus 320 according to a 20th embodiment of the invention. FIGS. 22 and 23 are a side view and a plan view, respectively, showing the arrangement of an important part of the optical pickup apparatus 320 of FIG. 21.

The optical pickup apparatus 320 is provided with a light source 321; two light reflecting portions 322a and 322b as a light reflecting means; a monitoring light detecting portions 323 as a monitoring light detecting means; an APC circuit 324 as a control means; a collimator lens 325; a beam splitter 326 as a light branching means; a quarter-wave plate 327; an upward-directing mirror 328; an objective lens 329 as a focusing means; a focusing lens 331; a cylindrical lens 332; and a light detecting portion 333 as light detecting means.

The light source 321 emits light. The two light reflecting portions 322a and 322b reflects parts of the light emitted from the light source 321 that are not used for information recording or reproduction. The monitoring light detecting portion 323 detects light beams reflected from the respective light reflecting means 322a and 322b. The APC circuit 324 controls the power of the light emitted from the light source 321 in accordance with a detection output of the monitoring light detecting means 323.

The collimator lens 325 converts, into generally parallel light, light that originates from the light source 321 and is used for information recording or reproduction. The beam splitter 326 transmits and reflects the light used for information recording or reproduction. The upward-directing mirror 328 reflects the light used for information recording or reproduction to change its optical path by about 90°. The objective lens 329 focuses the light used for information recording or reproduction on the information recording surface of an optical recording medium 330 as an information recording medium. The focusing lens 331 focuses light reflected from the optical recording medium 330. The cylindrical lens 332 gives astigmatism to converging light produced by the focusing lens 331. The light detecting portion 333 detects the light reflected from the optical recording medium 330.

The light source 321 is a semiconductor laser 321 made of a compound semiconductor of a group-III element and a group-V element on the periodic table. Most of light emitted from the semiconductor laser 321 enters the collimator lens 325 and is used for information recording or reproduction (described later). However, since the diverging light emitted from the semiconductor laser 321 has, at the collimator lens 325, a diameter that is larger than the diameter of the collimator lens 325, there exist outgoing beams 334a and 334b that go outside the outer periphery of the collimator lens 325. The outgoing beams 334a and 334b are not used for information recording or reproduction. Therefore, using the outgoing beams 334a and 334b for the optical power control on the semiconductor laser 321 makes it possible to prevent reduction in the efficiency of utilization of light that enters the collimator lens 325 and is used for information recording or reproduction.

Figure 24:
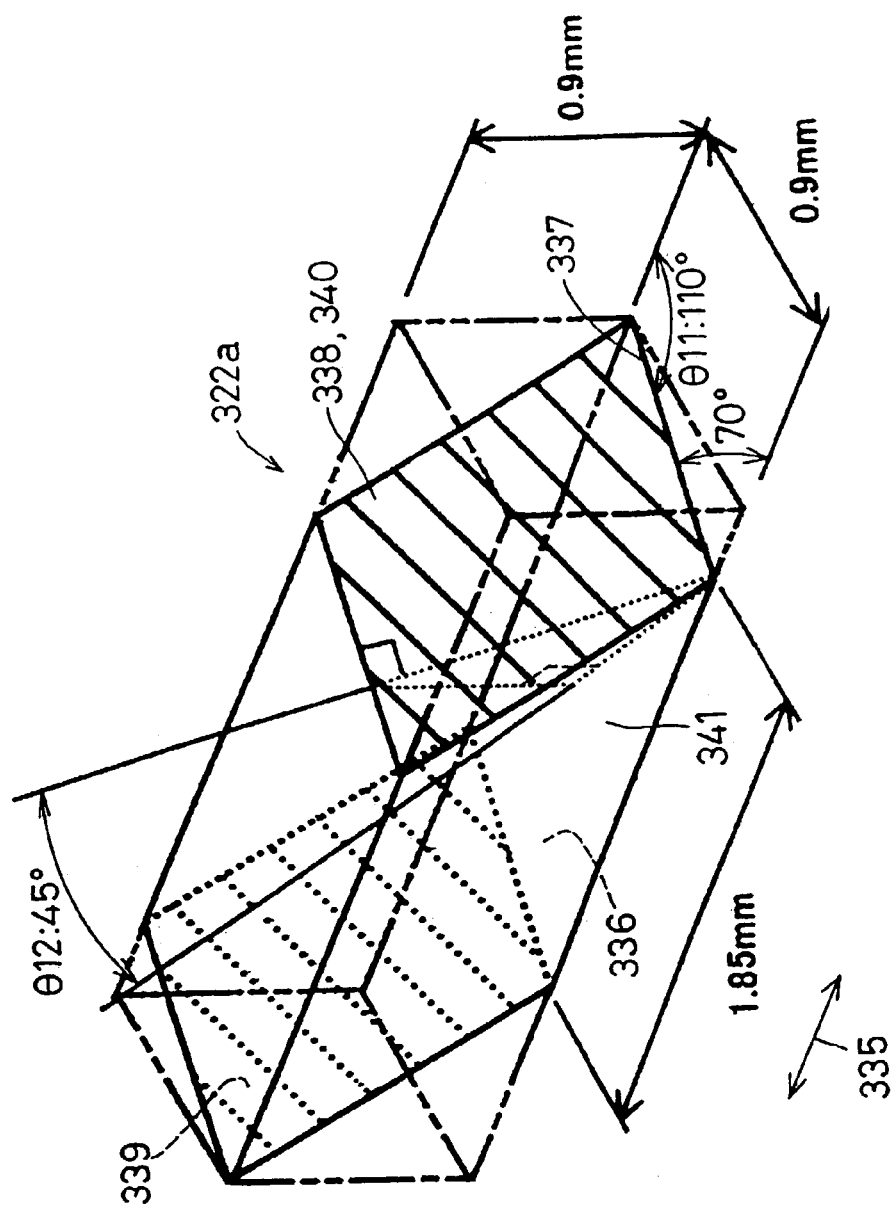
FIG. 24 is a perspective view showing the structure of a light reflecting portion.
Figure 25A:
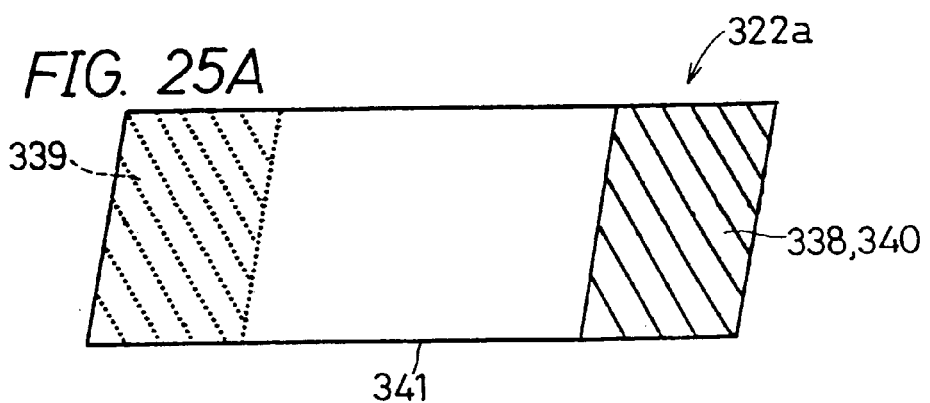
FIGS. 25A and 25B are a plan view and a side view, respectively, showing the structure of the light reflecting portion.
Figure 25B:
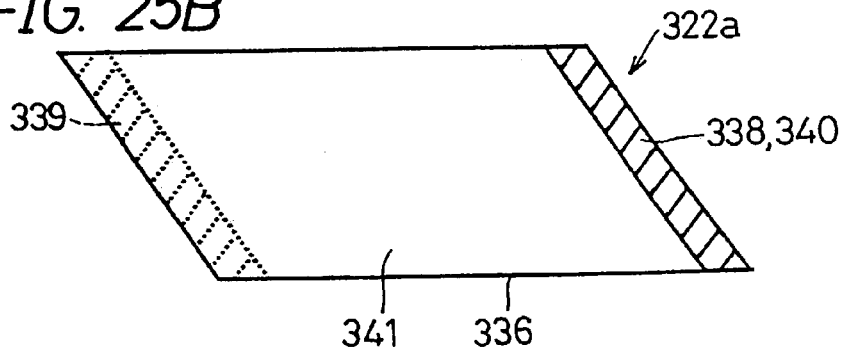

FIG. 24 is a perspective view showing the structure of the light reflecting portion 322a. FIGS. 25A and 25B are a plan view and a side view, respectively, showing the structure of the light reflecting portion 322a. The light reflecting portion 322a is made of glass, for example, and is a micro-mirror that has a parallelepiped shape being long in one direction (longitudinal direction) and in which a light reflecting layer is formed on one end face in the longitudinal direction.

The micro-mirror as the light reflecting portion 322a will be described below with reference to FIG. 24. A square prism made of glass and measuring 0.9 mm×0.9 mm×2 mm, for example, is prepared. One side face, parallel with the longitudinal direction (indicated by arrow 335), of the square prism is defined as a reference face 336 (in FIG. 24, the bottom face). One end face 338 is formed by cutting the square prism so that an angle θ11 that is formed by the direction of arrow 335 and an edge 337 formed by the reference face 336 and the end face 338 becomes 110° (70° in terms of a supplementary angle) and that an angle θ12 (inclination angle) that is formed by the reference face 336 and the end face 338 becomes 45°. Then, the other end face 339 is formed by cutting the end portion that is opposite to the end face 338 so that the end face 339 becomes parallel with the end face 338. A light reflecting layer 340 is formed by coating the end face 338 with a dielectric multilayer film, for example.

As described above, the light reflecting means 322a having a parallelepiped shape in which faces opposed to each other are congruent parallelograms and that is long in the direction of arrow 335 can be obtained by cutting a square prism and forming the light reflecting layer 340 on the one end face 338. The other light reflecting means 322b can be obtained by preparing the same glass square prism as described above, cutting the square prism so that when a resulting structure and the light reflecting means 322a are set side by side they become symmetrical with respect to an in-between center plane that is perpendicular to the reference faces 336, and forming a light reflecting layer on one end face. Returning to FIG. 21, the light reflecting means 322a and 322b are arranged in a direction that is parallel with the rotation axis of an optical recording medium 330 that is mounted so as to face the objective lens 329, at positions that are symmetrical with respect to the optical axis 347 of light emitted from the semiconductor laser 321.

Outgoing beams 334a and 334b going outside the outer periphery of the collimator lens 325 are reflected by the two respective light reflecting portion 322a and 322b toward the monitoring light detecting portion 323. As a result, the quantity of light received by the monitoring light detecting portion 323 can be made larger than in a case that the single monitoring light detecting portion 323 directly receives an outgoing beam coming from the semiconductor laser 321. Since the quantity of light received by the monitoring light detecting portion 323 is increased, the accuracy and the stability of the optical power control on the semiconductor laser 321 can be increased.

Figure 26A:
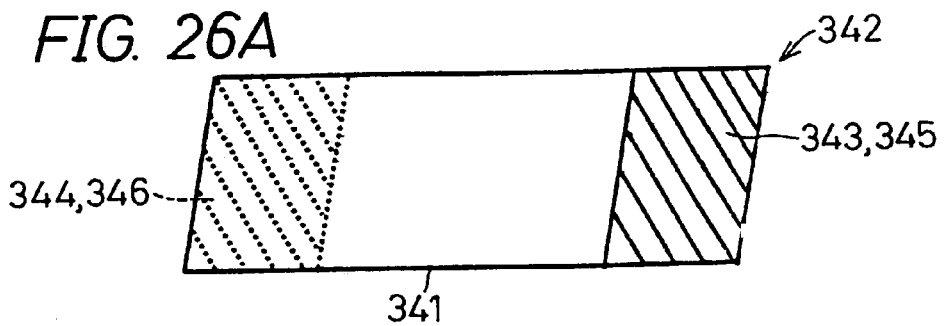
FIGS. 26A and 26B are plan views showing the structure of a light reflecting portion in which light reflecting layers are formed on the two respective end faces.
Figure 26B:
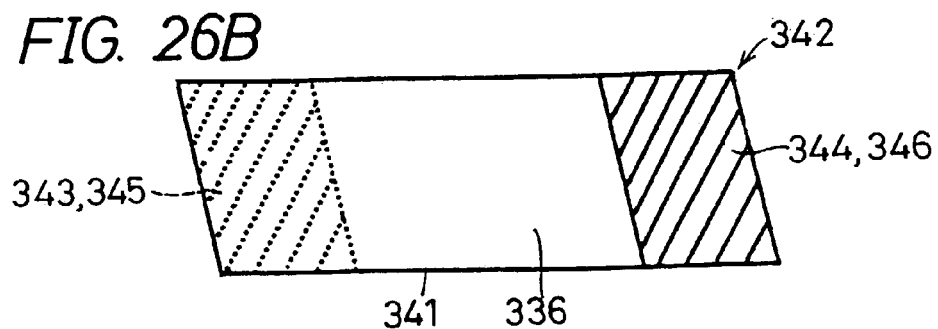

The light reflecting layer may be formed on both end faces of each light reflecting means. FIGS. 26A and 26B are plan views showing the structure of a light reflecting portion 342 as the light reflecting means in which light reflecting layers are formed on the two respective end faces. The light reflecting portion 342 is formed in the same manner as the above-described light reflecting portion 322a except that light reflecting layers 345 and 346 are formed on the two respective end faces 343 and 344. FIG. 26B (plan view) shows the light reflecting portion 342 as obtained by rotating the light reflecting portion 342 shown in FIG. 26A by 180° about an axial line extending in the top-bottom direction on the paper surface of FIG. 26B.

Forming the light reflecting layers 345 and 346 on the two respective end faces 343 and 344 of the light reflecting portion 342 makes it possible to use either of the end faces 343 and 344 as a light reflecting surface for reflecting an outgoing beam 334a or 334b. Therefore, preparing the light reflecting portion 342 of only one kind makes it possible to dispose two light reflecting portions 342 at positions that are symmetrical with respect to the optical axis 347 of light emitted from the semiconductor laser 321 and that allow the monitoring light detecting portion 323 to receive reflection beams. The number of kinds of parts can thus be reduced.

A photodiode (PD) that converts detected light into a current or voltage signal is used as the monitoring light detecting portion 323. The monitoring light detecting portion 323 may be a photodiode integrated circuit (PDIC) in which the PD and an integrated circuit (IC) having a signal amplifying portion for amplifying a signal produced by the PD are integrated with each other. The monitoring light detecting portion 323 is disposed at a position that is equidistant from the light reflecting portion 322a and 322b, and receives reflection beams 348a and 348b produced by the light reflecting portion 322a and 322b by reflecting outgoing beams 344a and 344b that go outside the outer periphery of the collimator lens 325, respectively.

The APC circuit 324 as the control means controls the optical output power of the semiconductor laser 321 to a constant value by supplying a drive current to the semiconductor laser 321 in accordance with a detection signal (a current or voltage signal) that is output from the monitoring light detecting portion 323. The APC circuit 324 compares the detection signal that is output from the monitoring light detecting portion 323 with a reference value that is set in the APC circuit 324 in advance, and supplies the semiconductor laser 321 with a drive current corresponding to the difference between the detection signal and the reference value. The APC circuit 324 performs a feedback operation so that the difference between the detection signal and the reference value comes closer to zero, whereby the optical output power of the semiconductor laser 321 is controlled-to a constant value.

An information recording or reproduction operation of the optical pickup apparatus 320 will be described below. Light to be used for information recording or reproduction that has been emitted from the semiconductor laser 321 and converted into generally parallel light by the collimator lens 325 enters the beam splitter 326. The beam splitter 326 transmits almost 100% of the incident light. The light that has passed through the beam splitter 326 is polarized by the quarter-wave plate 327, directed toward the optical recording medium 330 by the upward-directing mirror 328, and focused by the objective lens 329 on the information recording surface of the optical recording medium 330. The light that has been focused on the information recording surface of the optical recording medium 330 is reflected by the optical recording medium 330, again passes through the objective lens 329, is reflected by the upward-directing mirror 328, passes through the quarter-wave plate 327, and enters the beam splitter 326. The beam splitter 326 reflects almost 100% of the reflection light coming from the optical recording medium 330. The light reflected from the beam splitter 326 is focused by the focusing lens 331, given astigmatism by the cylindrical lens 332, and applied to the light detecting portion 333. A tracking error signal and focusing error signal for operation controls and an RF signal are generated on the basis of the reflection light coming from the optical recording medium 330 that is detected by the light detecting portion 333.

Figure 27:
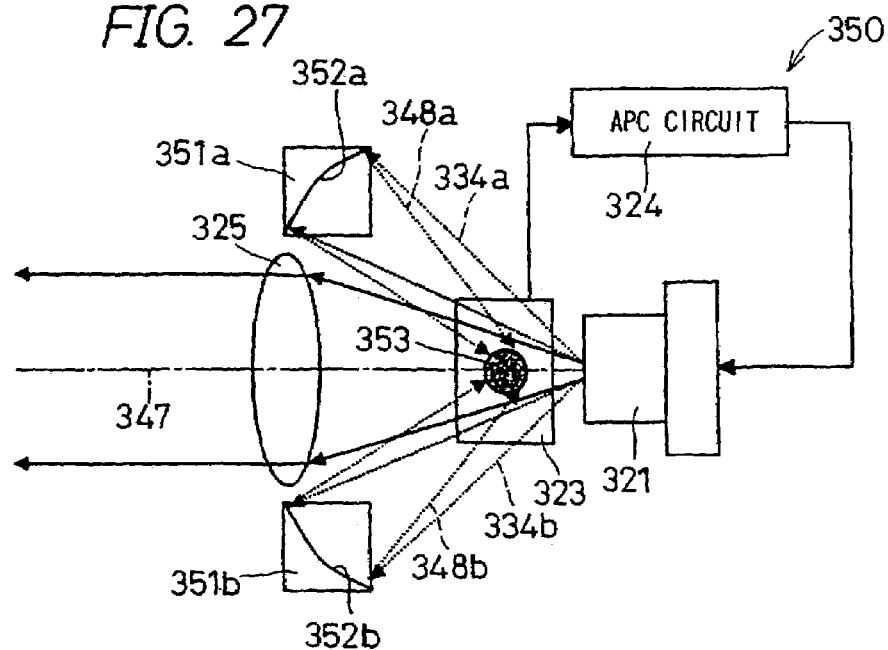
FIG. 27 is a simplified side view showing the arrangement of an important part of an optical pickup apparatus according to a 21st embodiment of the invention.

FIG. 27 is a simplified side view showing the arrangement of an important part of an optical pickup apparatus 350 according to a 21st embodiment of the invention. The optical pickup apparatus 350 according to this embodiment is similar to the optical pickup apparatus 320 according to the 20th embodiment. Components of the former having corresponding components in the latter are given the same reference numerals as the latter and will not be described. An important feature of the optical pickup apparatus 350 is that light reflecting surfaces 352a and 352b that are obtained by forming light reflecting layers on one end faces of light reflecting portions 351a and 351b as the light reflecting means are concave mirrors, respectively.

Since the light reflecting surfaces 352a and 352b are concave mirrors, the light reflecting portions 351a and 351b have focusing functions. Therefore, light beams that are emitted from the semiconductor laser 321 but are not used for information recording or reproduction can be received by the monitoring light detecting portion 323 after being reflected and focused. This allows a light receiving and detecting portion 353 of the monitoring light detecting portion 323 to receive reflection beams 348a and 348b more efficiently and increase the reception light quantity, which increases the accuracy and stability of the optical power control.

Figure 28:
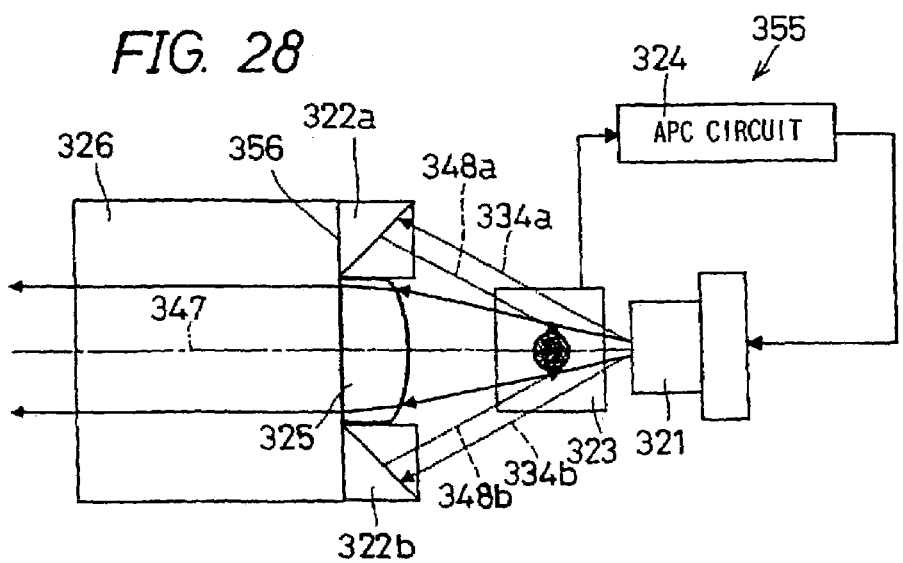
FIG. 28 is a simplified side view showing the arrangement of an important part of an optical pickup apparatus according to a 22nd embodiment of the invention.
Figure 29:
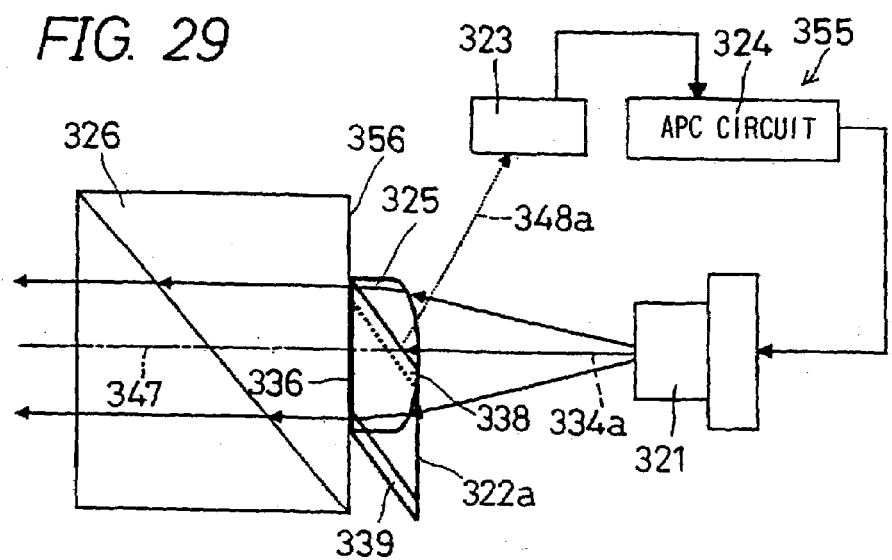
FIG. 29 is a plan view showing the arrangement of the important part of the optical pickup apparatus of FIG. 28.
Figure 30:
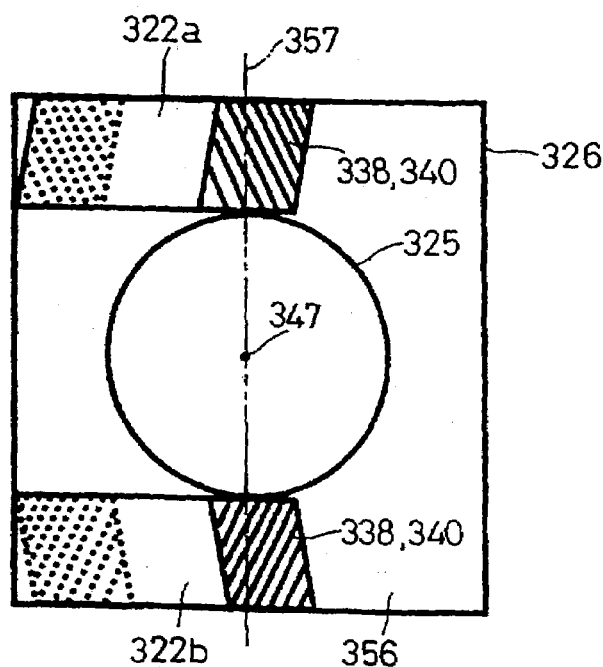
FIG. 30 is a front view showing the arrangement of a beam splitter, a collimator lens, and light reflecting portion that are provided in the optical pickup apparatus of FIG. 28.

FIG. 28 is a simplified side view showing the arrangement of an important part of an optical pickup apparatus 355 according to a 22nd embodiment of the invention. FIG. 29 is a plan view showing the arrangement of the important part of the optical pickup apparatus 355 of FIG. 28. FIG. 30 is a front view showing the arrangement of the beam splitter 326, the collimator lens 325, and the light reflecting portions 322a and 322b that are provided in the optical pickup apparatus 355 of FIG. 28. The optical pickup apparatus 355 according to this embodiment is similar to the optical pickup apparatus 320 according to the 20th embodiment. Components of the former having corresponding components in the latter are given the same reference numerals as the latter and will not be described. An important feature of the optical pickup apparatus 355 is that the reference faces 336 that are side faces, extending in the longitudinal directions, of the light reflecting portions 322a and 322b are directly attached to the semiconductor-laser-321-side face 356 of the beam splitter 326.

In the optical pickup apparatus 355, the relative arrangement of the beam splitter 326 and the collimator lens 325 is as follows. The semiconductor-laser-321-side face 356 of the beam splitter 326 has a square shape in a front view, and the center of gravity of the face 356 and the center of the collimator lens 325 are both located on the optical axis 347. With this arrangement, the collimator lens 325 is directly attached to the face 356 of the beam splitter 326.

The reference faces 336 of the light reflecting portions 322a and 322b are flat, and the semiconductor-laser-321-side face 356 of the beam splitter 326 is also flat. Therefore, in a state that the reference faces 326 of the light reflecting portions 322a and 322b are in contact with the face 356 of the beam splitter 326, the positions of the light reflecting surfaces which are obtained by forming the light reflecting layers 340 on the end faces 338 of the light reflecting portions 322a and 322b can be changed freely without varying the inclination angles of the light reflecting surfaces with respect to the faces 356.

The light reflecting portions 322a and 322b can be attached to the face 356 of the beam splitter 326 without using a special measuring instrument, adjustment jig, or the like by performing, in a state that the reference faces 336 of the light reflecting portions 322a and 322b are in contact with the face 356 of the beam splitter 326, a simple operation of setting side faces, perpendicular to the reference faces 336, of the light reflecting portions 322a and 322b flush with the associated side faces of the beam splitter 326 and setting approximately central points of the light reflecting surfaces of the light reflecting portions 322a and 322b on an axial line 357 that is perpendicular to the optical axis 347 and parallel with the rotation axis of the optical recording medium 330 as projected onto the face 356 of the beam splitter 326.

Integrating the light reflecting portions 322a and 322b with the beam splitter 326 in the above-described manner greatly simplify the distance/angle adjustment work that is necessary to position the light reflecting portions 322a and 322b and the monitoring light detecting portion 323 relative to each other in assembling the apparatus, whereby the efficiency of manufacture can be increased.

Figure 31:
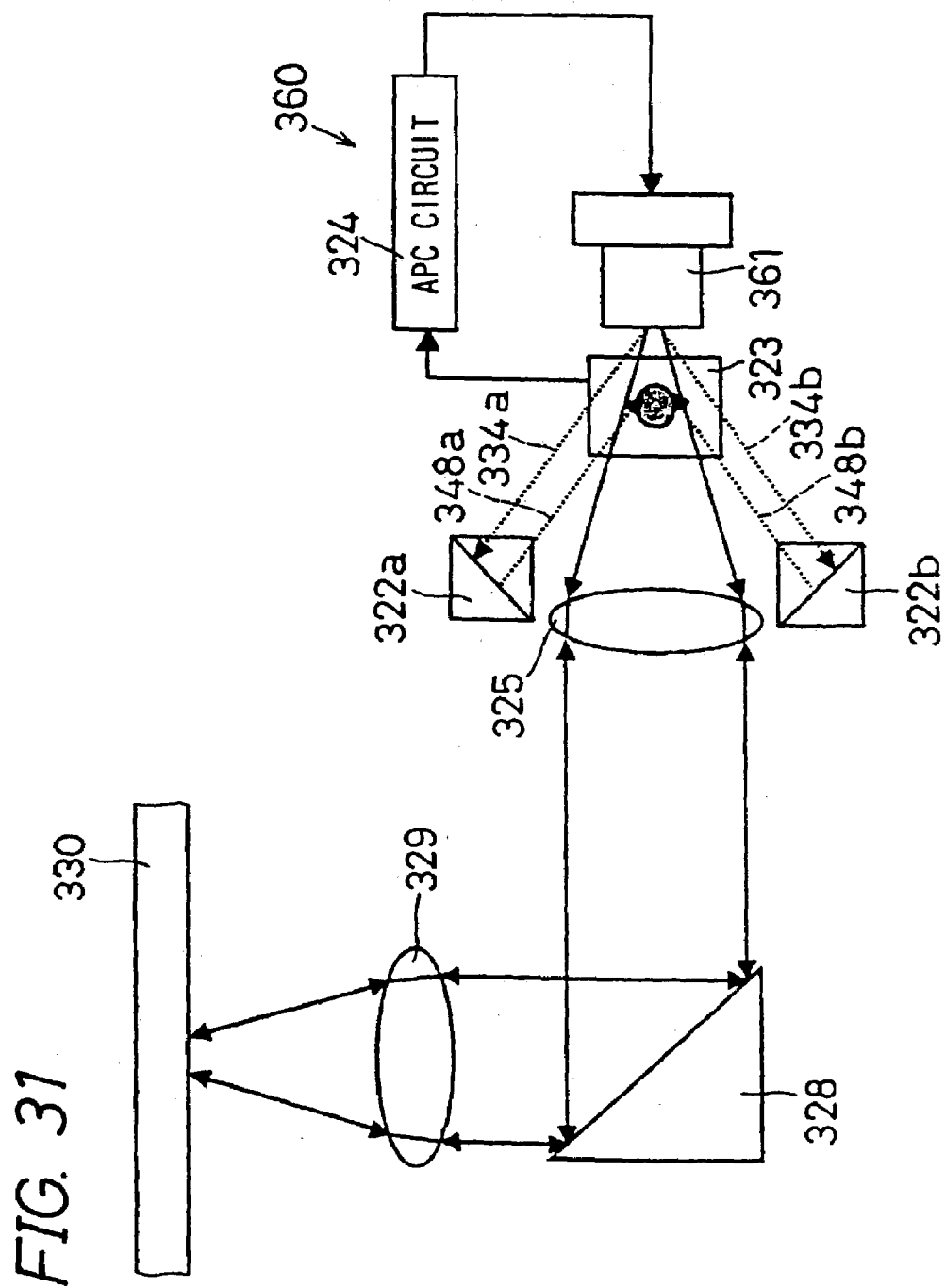
FIG. 31 is a simplified side view showing the arrangement of an important part of an optical pickup apparatus according to a 23rd embodiment of the invention.

FIG. 31 is a simplified side view showing the arrangement of an optical pickup apparatus 360 according to a 23rd embodiment of the invention. The optical pickup apparatus 360 according to this embodiment is similar to the optical pickup apparatus 320 according to the 20th embodiment. Components of the former having corresponding components in the latter are given the same reference numerals as the latter and will not be described. An important feature of the optical pickup apparatus 360 is that the semiconductor laser as the light source and the light detecting means for receiving reflection light coming from the optical recording medium 330 are integrated with each other into a single part which is a light emitting and receiving unit 361.

In the optical pickup apparatus 360, light emitted from the light emitting and receiving unit 361 is converted into generally parallel light by the collimator lens 325, directed to the optical recording medium 330 by the upward-directing mirror 328, and focused by the objective lens 329 onto the information recording surface of the optical recording medium 330. Light that has been reflected by the optical recording medium 330 goes, in the reverse direction, along the same optical path as was taken in going toward the optical recording medium 330, and is received by the light emitting and receiving unit 361. Therefore, no beam splitter for directing, to the light detecting portion, reflection light coming from the optical recording medium 330 is necessary. Since the number of parts is reduced by virtue of the integration into a single part of the semiconductor laser and the light detecting means, not only can the accuracy and the stability of the optical power control be increased but also the optical pickup apparatus 360 can be made compact. Further, since the number of parts used in assembling the apparatus is reduced, the efficiency of assembling work can be increased.

Figure 32:
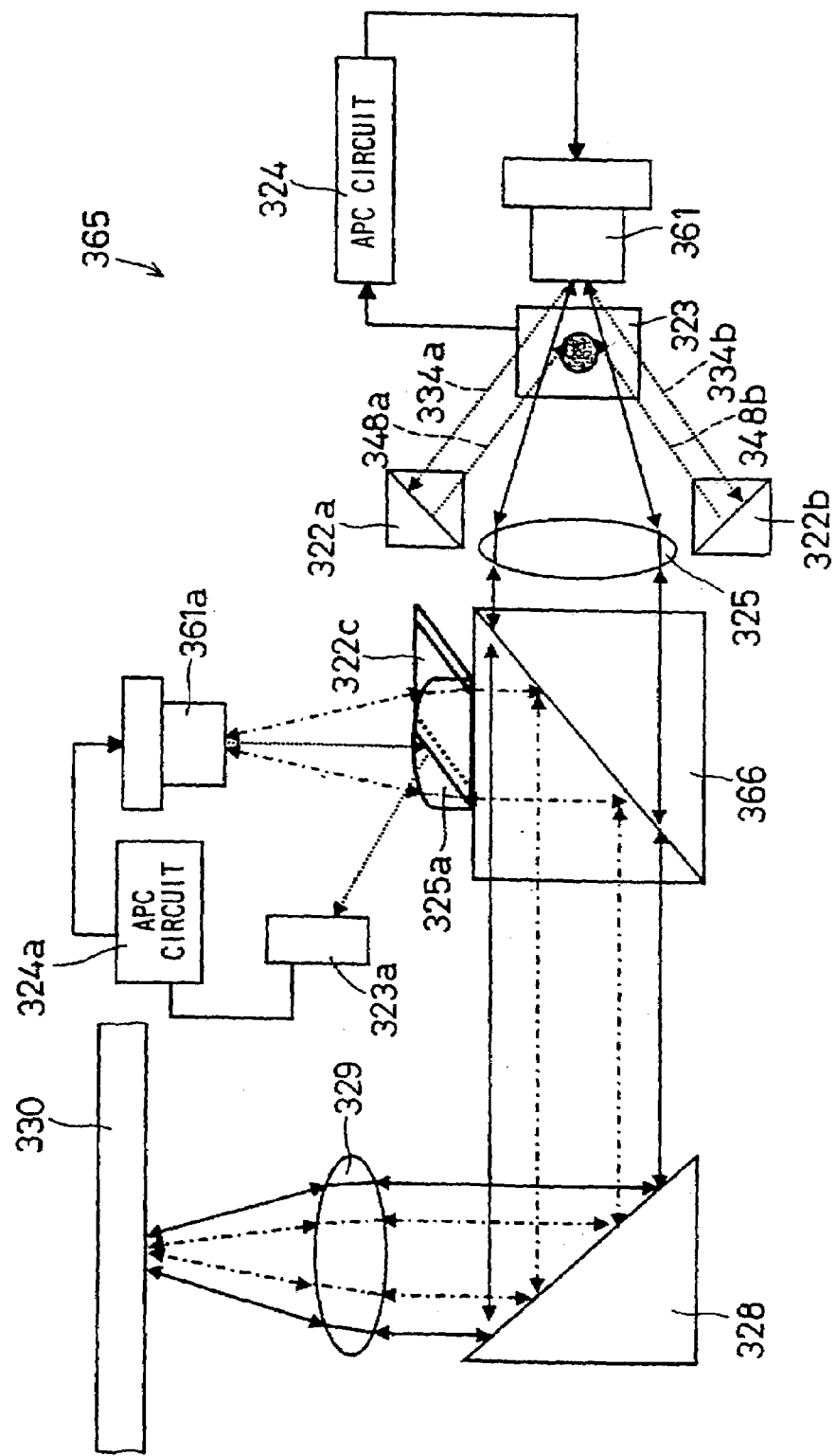
FIG. 32 is a simplified side view showing the arrangement of an important part of an optical pickup apparatus according to a 24th embodiment of the invention.
Figure 33:
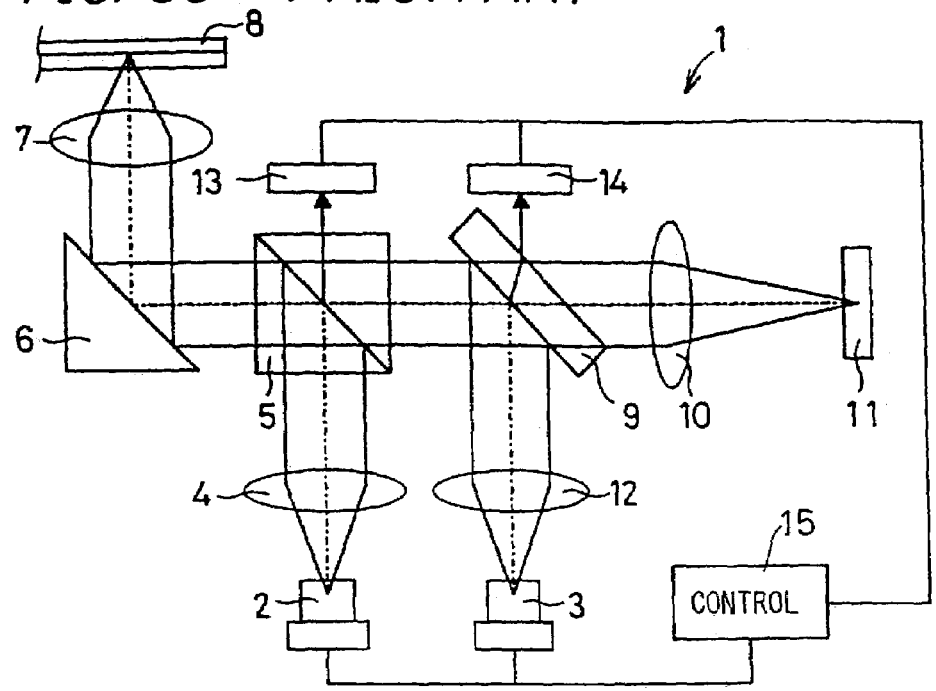
FIG. 33 shows an example of optical output power monitoring of a conventional optical pickup apparatus that is equipped with two light sources having different wavelengths.
Figure 34:
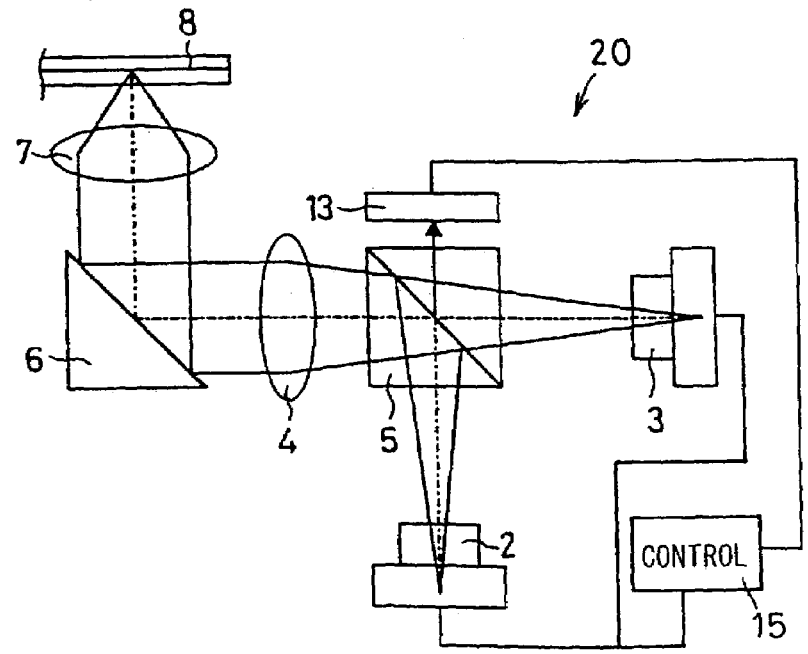
FIG. 34 shows an example of optical output power monitoring of another conventional optical pickup apparatus.
Figure 35:
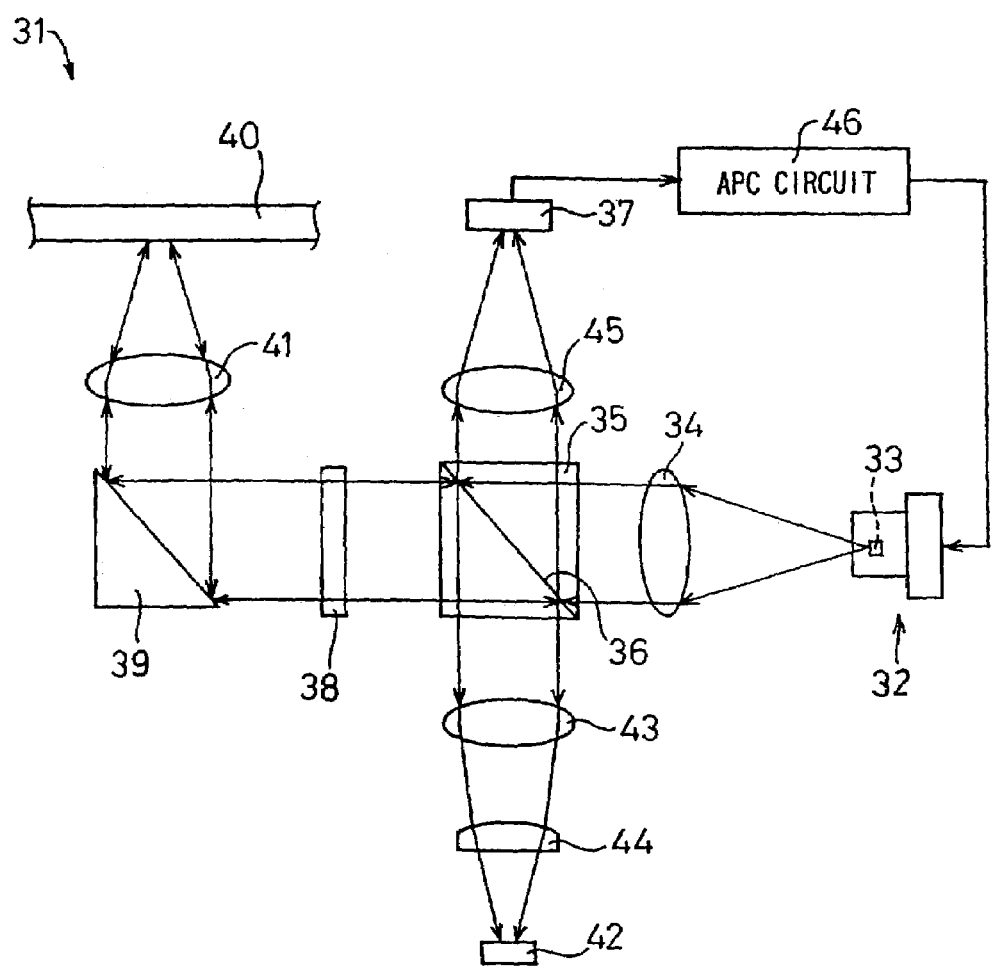
FIG. 35 is a simplified system diagram showing the configuration of another conventional optical pickup apparatus.
Figure 36:
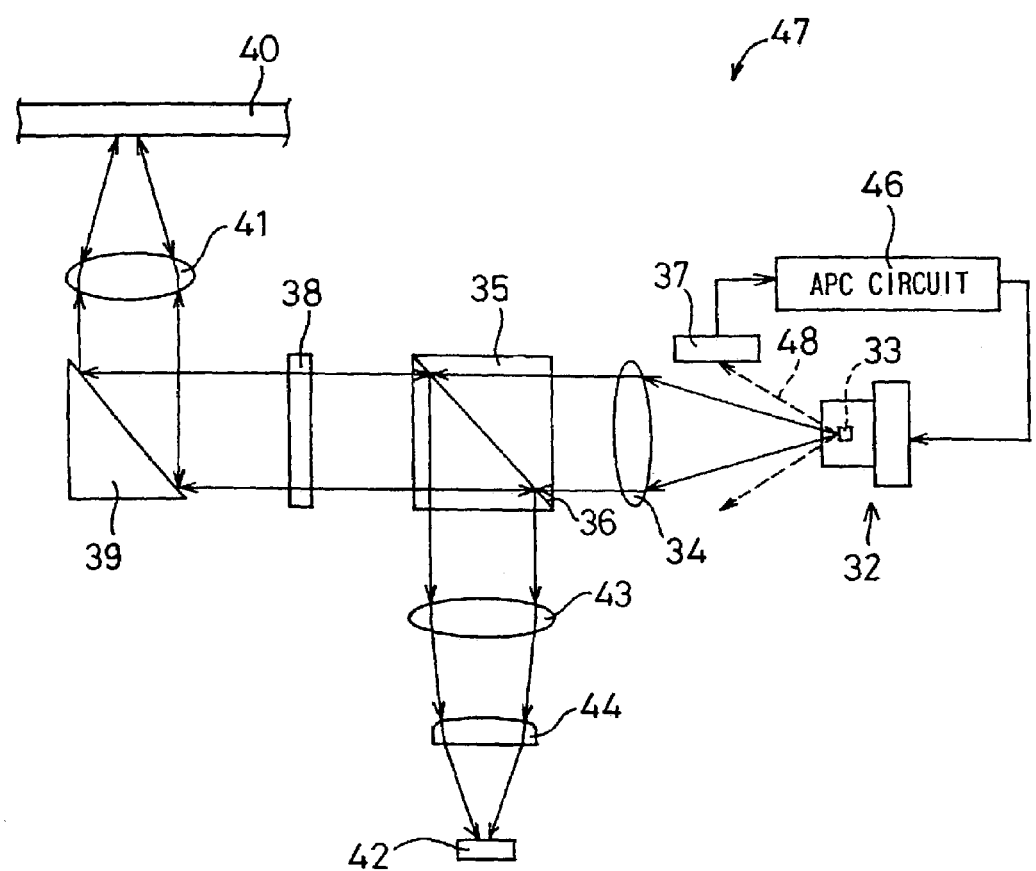
FIG. 36 is a simplified system diagram showing the configuration of a still another conventional optical pickup apparatus.
Figure 37:
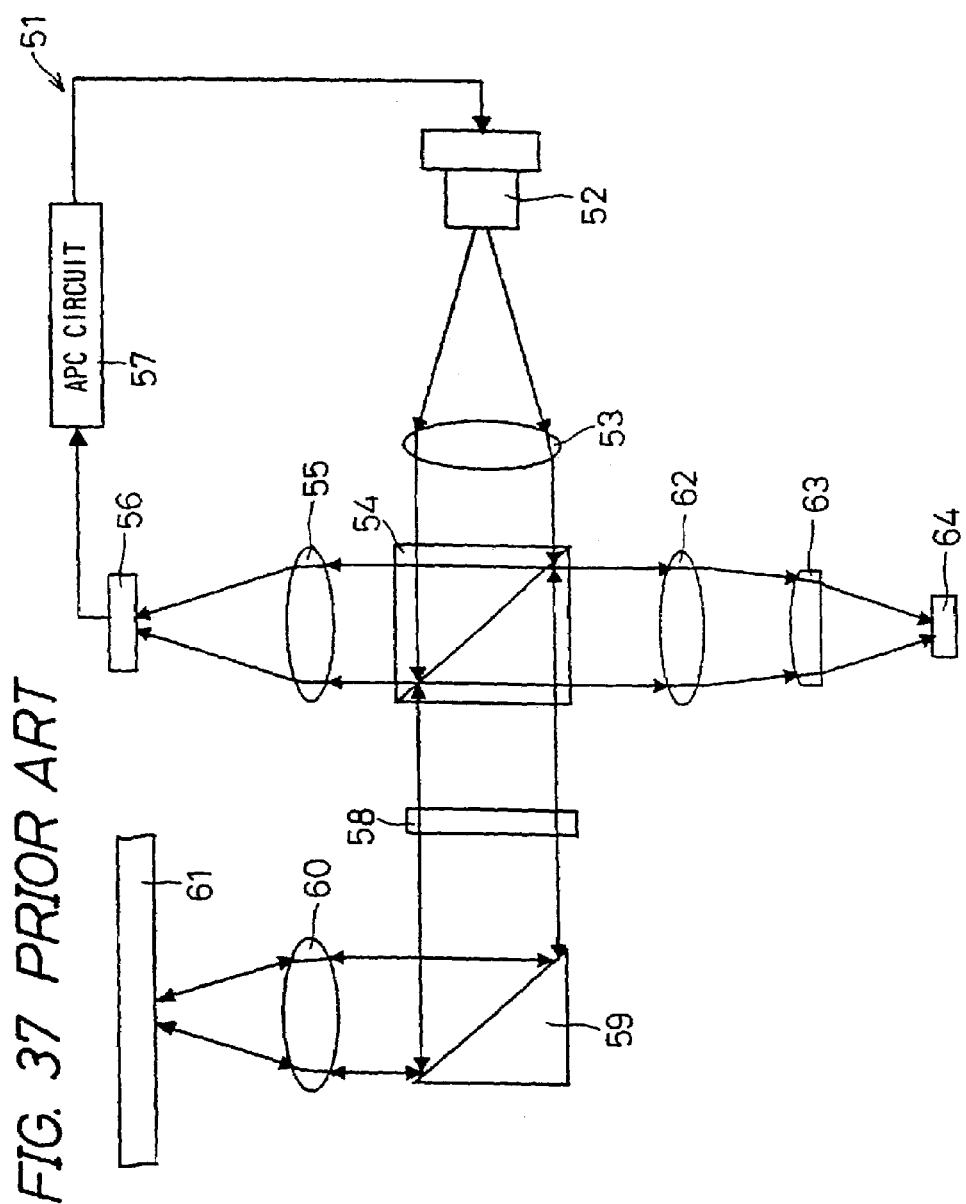
FIG. 37 is a simplified side view showing the arrangement of a conventional optical pickup apparatus using a front monitoring method.
Figure 38:
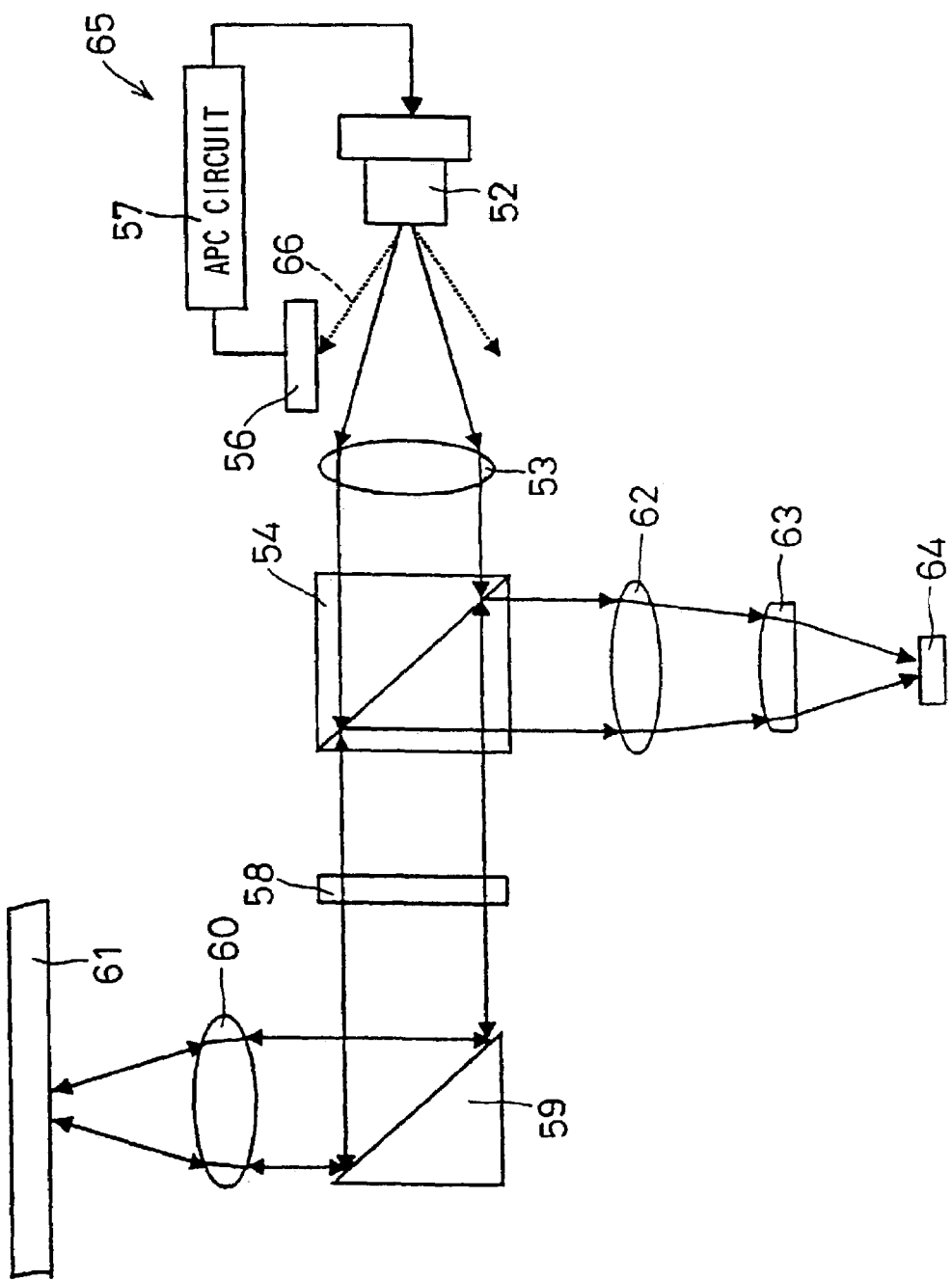
FIG. 38 is a simplified side view showing the arrangement of another conventional optical pickup apparatus using the front monitoring method.

FIG. 32 is a simplified side view showing the arrangement of an optical pickup apparatus 365 according to a 24th embodiment of the invention. The optical pickup apparatus 365 according to this embodiment is similar to the optical pickup apparatus 360 according to the 23rd embodiment. Components of the former having corresponding components in the latter are given the same reference numerals as the latter and will not be described. An important feature of the optical pickup apparatus 365 is that it is provided with two semiconductor lasers that emit light beams having different wavelengths.

In the optical pickup apparatus 365 according to this embodiment, the two semiconductor lasers are integrated with light detecting portion into single parts which are two light emitting and receiving units 361 and 361a, respectively.

For example, the two light emitting and receiving units 361 and 361a emit infrared laser light having a wavelength 780 nm and red laser light having a wavelength 650 nm, respectively. The power of light emitted from the light emitting and receiving unit 361 is controlled in the same manner as in the optical pickup apparatus 360 according to the 23rd embodiment, and is used for information recording or reproduction.

Outgoing beams that are emitted from the other light emitting and receiving unit 361a and go outside the outer periphery of a collimator lens 325a and hence are not used for information recording or reproduction are reflected by a pair of light reflecting portion 322c and received by the other monitoring light detecting portion 323a. The monitoring light detecting portion 323a supplies an electrical signal corresponding to a reception light quantity to the other APC circuit 324a. The APC circuit 324a supplies a drive current for the semiconductor laser to the light emitting and receiving unit 361a in accordance with an output of the monitoring light detecting portion 323a. The drive current serves to control the optical output power of the semiconductor laser of the light emitting and receiving unit 361*a* to a constant value.

Light that is emitted from the light emitting and receiving unit 361*a* and enters the collimator lens 325*a* is reflected by a beam splitter 366 toward the upward-directing mirror 328. The light shining on the upward-directing mirror 328 is directed to the optical recording medium 330, and focused by the objective lens 329 on the information recording surface of the optical recording medium 330. The light focused on the information recording surface of the optical recording medium 330 is reflected by the optical recording medium 330, again passes through the objective lens 329, is reflected by the upward-directing mirror 328, and enters the beam splitter 366. The beam splitter 366 reflects, toward the light emitting and receiving unit 361*a*, almost 100% of the reflection light coming from the optical recording medium 330 so as to be received by the light emitting and receiving unit 361*a* having a light detecting portion.

The beam splitter 366 of the optical pickup apparatus 365 is configured so as to transmit both of light emitted from the light emitting and receiving unit 361 and light that is emitted from the light emitting and receiving unit 361, is reflected by the optical recording medium 330, and enters the beam splitter 366.

In the above-configured optical pickup apparatus 365, information recording or reproduction on a compact disc (CD) can be performed by using the light emitting and receiving unit 361 that emits infrared laser light having a wavelength 780 nm and information recording or reproduction on a digital versatile disc (DVD) by using the light emitting and receiving unit 361*a* that emits red laser light having a wavelength 650 nm. That is, the optical pickup apparatus 365 can accommodate two kinds of optical recording media on which information recording or reproduction is performed by using light beams having different wavelengths.

As described above, in this embodiment, the light reflecting portions 322*a* and 322*b* are arranged in a direction parallel with the rotation axis of the optical recording medium 330. However, the invention is not limited to such a case; the light reflecting portions 322*a* and 322*b* may be arranged in a direction perpendicular to the rotation axis. Further, although the two light reflecting portions are disposed adjacent to the outer periphery of the collimator lens 323, the invention is not limited to such a case; three or more light reflecting means may be provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus which records or reproduces information on or from an optical recording medium, comprising:
    a light source for emitting light;
    an objective lens opposed to the optical recording medium, for focusing light originating from the light source on the information recording surface of the optical recording medium;
    a light separation optical element disposed between the light source and the objective lens, for transmitting or reflecting the light originating from the light source;
    a collimator lens disposed between the light separation optical element and the objective lens, for converting the light originating from the light source into generally parallel light;
    light reflecting means for reflecting part of the light emitted from the light source;
    optical output power detecting means for detecting the light reflected from the light reflecting means; and
    optical power control means for controlling the power of the light emitted from the light source in accordance with a detection output of the optical output power detecting means wherein the light reflecting means is attached to the collimator lens.

2. The optical pickup apparatus of claim 1, wherein the light reflecting means is disposed between the light source and the light separation optical element.

3. The optical pickup apparatus of claim 1, wherein the light reflecting means is disposed on an axis that is associated with a larger one of spread angles that are associated with two respective orthogonal axes formed on a plane that is perpendicular to the optical axis of the light emitted from the light source.

4. The optical pickup apparatus of claim 1, further comprising an optical path changing reflector disposed between the collimator lens and the objective lens, for reflecting the light originating from the light source to change its optical path,
    and wherein the light reflecting means is disposed in such a manner that the normal to the reflecting surface of the reflecting means is not parallel with the optical axis of light that is reflected from the optical path changing reflector toward the optical recording medium.

5. The optical pickup apparatus of claim 4, further comprising a second light source, wherein the two light sources emit light beams having different wavelengths, and further comprising a second light reflecting means, wherein the two light reflecting means are provided so as to be associated with the two respective light sources.

6. An optical pickup apparatus which records or reproduces information on or from an optical recording medium, comprising:
    a first and a second light source for emitting light;
    an objective lens opposed to the optical recording medium, for focusing light originating from the light source on the information recording surface of the optical recording medium;
    a light separation optical element disposed between the light source and the objective lens, for transmitting or reflecting the light originating from the light source;
    a collimator lens disposed between the light separation optical element and the objective lens, for converting the light originating from the light source into generally parallel light;
    light reflecting means for reflecting part of the light emitted from the light source;
    optical output power detecting means for detecting the light reflected from the light reflecting means; and
    optical power control means for controlling the power of the light emitted from the light source in accordance with a detection output of the optical output power detecting means,
    wherein the first light source and the second light source which are selected such that a wavelength of light emitted from first light source and a wavelength of light emitted from the second light source are different from each other and wherein the light reflecting means is attached to the light separation optical element and is constituted so that part of the light which is emitted from the first light source and reflected by the light separation optical element and part of the light which is emitted from the second light source and transmitted by the light separation optical element are both reflected by the light reflecting means and both of the reflected parts of light enter the optical output power detecting means.

7. An optical pickup apparatus which records or reproduces information on or from an optical recording medium, comprising:

a light source for emitting light;

an objective lens opposed to the optical recording medium, for focusing light originating from the light source on the information recording surface of the optical recording medium;

a light separation optical element disposed between the light source and the objective lens, for transmitting or reflecting the light originating from the light source;

a collimator lens disposed between the light separation optical element and the objective lens, for converting the light originating from the light source into generally parallel light;

light reflecting means for reflecting part of the light emitted from the light source;

optical output power detecting means for detecting the light reflected from the light reflecting means; and optical power control means for controlling the power of the light emitted from the light source in accordance with a detection output of the optical output power detecting means and further comprising a holding member for holding the collimator lens, and wherein the light reflecting means is attached to the holding member.

8. An optical pickup apparatus which records or reproduces information on or from an optical recording medium, comprising:

a light source for emitting light;

an objective lens opposed to the optical recording medium, for focusing light originating from the light source on the information recording surface of the optical recording medium;

a light separation optical element disposed between the light source and the objective lens, for transmitting or reflecting the light originating from the light source;

a collimator lens disposed between the light separation optical element and the objective lens, for converting the light originating from the light source into generally parallel light;

an optical path changing reflector disposed between the collimator lens and the objective lens, for reflecting the light originating from the light source to change its optical path;

optical output power detecting means for detecting part of the light that is emitted from the light source, passes through the collimator lens, and goes by the optical path changing reflector instead of shining on it; and optical power control means for controlling the power of the light emitted from the light source in accordance with a detection output of the optical output power detecting means.

* * * * *